United States Patent [19]

Olson et al.

[11] Patent Number: 5,737,226

[45] Date of Patent: Apr. 7, 1998

[54] VEHICLE COMPASS SYSTEM WITH AUTOMATIC CALIBRATION

[75] Inventors: Thomas R. Olson; Jeffrey N. Parks; Paul S. VanLente, all of Holland, Mich.

[73] Assignee: Prince Corporation, Holland, Mich.

[21] Appl. No.: 462,468

[22] Filed: Jun. 5, 1995

[51] Int. Cl.$^6$ ............................................. G05D 1/00
[52] U.S. Cl. ............................................. 364/457
[58] Field of Search .................. 364/457, 571.03, 364/571.04, 449, 571.01, 571.02; 33/356, 361

[56] References Cited

U.S. PATENT DOCUMENTS

| | | | |
|---|---|---|---|
| 2,053,154 | 9/1936 | Pierre | 171/95 |
| 2,056,715 | 10/1936 | Dinsmore | 33/223 |
| 2,132,168 | 10/1938 | Klein et al. | 33/223 |
| 2,177,218 | 10/1939 | Klein et al. | 33/222 |
| 2,308,566 | 1/1943 | Noxon | 33/204 |
| 2,475,593 | 7/1949 | Craddock et al. | 318/24 |
| 2,852,859 | 9/1958 | Depp | 33/225 |
| 2,903,798 | 9/1959 | Taylor | 33/225 |
| 3,626,280 | 12/1971 | Van Englehoven et al. | 324/43 R |
| 3,678,593 | 7/1972 | Baker et al. | 33/355 |
| 3,744,312 | 7/1973 | Anderson | 73/178 |
| 3,746,842 | 7/1973 | Fowler | 235/92 CV |
| 3,778,703 | 12/1973 | Jackson | 324/43 R |
| 3,807,666 | 4/1974 | Devlin | 244/77 M |
| 3,903,610 | 9/1975 | Heaviside et al. | 33/361 |
| 3,943,763 | 3/1976 | Garner | 73/178 R |
| 3,971,981 | 7/1976 | Nakagome et al. | 324/43 R |
| 3,991,361 | 11/1976 | Mattern et al. | 324/43 R |
| 4,024,382 | 5/1977 | Fowler | 235/150.26 |
| 4,030,204 | 6/1977 | Edwards | 33/361 |
| 4,031,630 | 6/1977 | Fowler | 33/356 |
| 4,091,543 | 5/1978 | Lapeyre | 33/356 |
| 4,112,755 | 9/1978 | Sullivan | 73/178 R |
| 4,143,467 | 3/1979 | Erspamer et al. | 33/356 |
| 4,146,970 | 4/1979 | Edwards | 33/363 K |
| 4,157,619 | 6/1979 | Zuvela | 33/352 |
| 4,163,326 | 8/1979 | Edwards | 33/361 |
| 4,179,741 | 12/1979 | Rossani | 364/457 |
| 4,250,626 | 2/1981 | Lazar | 33/363 R |
| 4,277,751 | 7/1981 | Lawson et al. | 324/254 |
| 4,293,815 | 10/1981 | West et al. | 324/254 |
| 4,309,828 | 1/1982 | Sakamoto | 33/355 R |
| 4,336,596 | 6/1982 | Martin | 364/559 |
| 4,341,023 | 7/1982 | Marcus et al. | 33/363 K |
| 4,347,730 | 9/1982 | Fisher et al. | 73/1 E |
| 4,373,271 | 2/1983 | Nitz | 33/361 |
| 4,413,424 | 11/1983 | Sasaki et al. | 33/361 |
| 4,414,753 | 11/1983 | Moulin et al. | 33/356 |
| 4,416,067 | 11/1983 | Scherer et al. | 33/356 |
| 4,424,631 | 1/1984 | Franks | 33/361 |
| 4,425,717 | 1/1984 | Marcus | 33/361 |
| 4,429,469 | 2/1984 | Tsushima et al. | 33/361 |
| 4,445,279 | 5/1984 | Tsushima et al. | 33/356 |
| 4,505,054 | 3/1985 | Clark et al. | 33/357 |
| 4,539,760 | 9/1985 | Marchent et al. | 33/356 |

(List continued on next page.)

FOREIGN PATENT DOCUMENTS 2193321  2/1988  United Kingdom.

OTHER PUBLICATIONS

United States Patent Application Serial No. 08/297,699 entitled Vehicle Compass Correction Circuit.

*Primary Examiner*—Kevin J. Teska
*Assistant Examiner*—Stephen J. Walder, Jr.
*Attorney, Agent, or Firm*—Price, Heneveld, Cooper, DeWitt & Litton

[57] ABSTRACT

An electrical system providing automatic calibration of a vehicle compass for abrupt and significant changes in vehicle magnetism. The system includes a magnetic field sensor providing signal information representing the magnetic field sensed within the vehicle. Coupled to the sensor is an electrical circuit for processing the signal information from the sensor to determine if a shift in vehicle magnetism has occurred and for calculating compensation signal information to provide a corrected heading display.

38 Claims, 27 Drawing Sheets

U.S. PATENT DOCUMENTS

| | | | |
|---|---|---|---|
| 4,546,550 | 10/1985 | Marchent et al. | 33/356 |
| 4,546,551 | 10/1985 | Franks | 33/356 |
| 4,555,761 | 11/1985 | Matsumoto et al. | 364/424 |
| 4,611,293 | 9/1986 | Hatch et al. | 364/571 |
| 4,622,754 | 11/1986 | Chujo et al. | 33/356 |
| 4,622,843 | 11/1986 | Hormel | 73/1 E |
| 4,672,565 | 6/1987 | Kuno et al. | 364/571 |
| 4,677,381 | 6/1987 | Geerlings | 33/361 |
| 4,677,754 | 7/1987 | Hormel | 33/361 |
| 4,680,866 | 7/1987 | Johnson et al. | 33/356 |
| 4,685,053 | 8/1987 | Hattori et al. | 364/184 |
| 4,686,772 | 8/1987 | Sobel | 33/333 |
| 4,698,912 | 10/1987 | Fowler et al. | 33/356 |
| 4,720,992 | 1/1988 | Hormel | 73/1 E |
| 4,729,172 | 3/1988 | Alberter et al. | 33/356 |
| 4,733,179 | 3/1988 | Bauer et al. | 324/244 |
| 4,738,031 | 4/1988 | Alberter et al. | 33/356 |
| 4,751,783 | 6/1988 | Ina et al. | 33/361 |
| 4,791,729 | 12/1988 | Suda | 33/356 |
| 4,797,841 | 1/1989 | Hatch | 364/571.04 |
| 4,807,462 | 2/1989 | Al-Attar | 73/1 E |
| 4,831,563 | 5/1989 | Ando et al. | 364/571.05 |
| 4,841,449 | 6/1989 | Suyama | 364/449 |
| 4,866,627 | 9/1989 | Suyama | 364/457 |
| 4,890,233 | 12/1989 | Ando et al. | 364/457 |
| 4,953,305 | 9/1990 | Van Lente et al. | 33/356 |
| 5,023,799 | 6/1991 | Nakayama et al. | 364/449 |
| 5,046,031 | 9/1991 | Wanous | 364/571.02 |
| 5,090,231 | 2/1992 | Gallagher | 73/1 E |
| 5,117,375 | 5/1992 | Worcester et al. | 364/571.01 |
| 5,131,155 | 7/1992 | Takano et al. | 33/356 |
| 5,161,311 | 11/1992 | Esmer et al. | 33/356 |
| 5,187,872 | 2/1993 | Dufour | 33/356 |
| 5,235,514 | 8/1993 | Matsuzaki | 364/454 |
| 5,255,442 | 10/1993 | Schierbeek et al. | 33/361 |
| 5,287,297 | 2/1994 | Ihara et al. | 364/571.02 |
| 5,297,063 | 3/1994 | Cage | 364/571.02 |
| 5,297,065 | 3/1994 | Cage et al. | 364/571.05 |
| 5,323,336 | 6/1994 | Cage | 364/574 |
| 5,333,110 | 7/1994 | Al-Attar | 364/449 |
| 5,351,204 | 9/1994 | Al-Attar | 364/571.03 |
| 5,353,241 | 10/1994 | Al-Attar | 364/571.01 |
| 5,390,122 | 2/1995 | Michaels et al. | 364/443 |

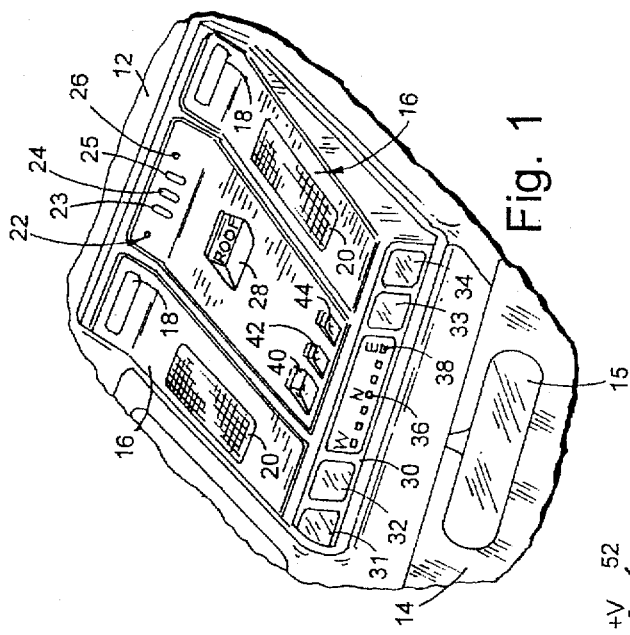

VEHICLE COMPASS SYSTEM WITH AUTOMATIC CALIBRATION

BACKGROUND OF THE INVENTION

The present invention relates to magnetic direction sensing systems and particularly those for use in vehicles.

U.S. Pat. No. 4,953,305, assigned to the present assignee, discloses a magnetic field sensor and microprocessor controlled compass system for a vehicle which is automatically and continuously calibrated to account for changes in the vehicle's magnetism and thus the system's reaction to the earth's magnetic field during the life of the vehicles. The system includes means for testing the data received from the compass sensor to determine the maximum and minimum signal levels during movement of the vehicle through a completed 360° path of travel however circuitous the path may be. This data is averaged over several such paths of vehicular travel to provide continuously updated and averaged compensation correction information.

Although this system is a substantial improvement in vehicle compass operation and provides more accurate heading information over differing operating conditions, its somewhat lengthy averaging process and method of gradual compensation makes it primarily suited for the compensation of slow and gradual changes in vehicle magnetism. As such, this compass system may be unable to adequately compensate for and recover from an abrupt and significant change in vehicle magnetism caused by, for example, driving the vehicle near the electrical power feeders of train or subway systems, installing a magnetic cellular antennae on the vehicle's roof, or even driving through a car wash which can flex the sheet metal in the vicinity of the compass sensor and change its magnetic characteristics. Thus, such an event may cause a substantial impairment of compass operation resulting in at least short term erroneous heading information to be displayed until recompensation of the system is achieved.

A particular problem with vehicular magnetism exists before sale of a new vehicle to a customer. At this time, the vehicle may be substantially magnetized due to either the manufacturing process or the method of delivery of the vehicle to the dealer. In order to ensure that the compass system is providing accurate heading information upon initial power-up by the customer, changed or existing vehicular magnetism must be compensated for or eliminated. The means chosen to perform this function should be easy and efficient so that servicing of the vehicle is avoided, and should be capable of being performed at either the factory or at individual dealerships. Although factory compensation of a new vehicle's compass has been standard practice for many years, current methods have proven to be inadequate. For example, eliminating the magnetism requires special degaussing equipment that is very expensive, and assigning the duty of manual calibration to the manufacturer or to individual dealers is problematic. One method of compass compensation at the factory involves identifying the magnetic field at a particular location and, when the vehicle is positioned in a predetermined direction at this location, providing calibration signals to correct for any differences in the displayed heading and the known heading for the existing magnetic field at said position along the assembly line. This method is problematic in that a magnetically stable location may be impossible to maintain in a factory environment due to the possibility of stray or changing magnetic fields and disturbances which would potentially cause miscalibration of the compass resulting in erroneous heading information being displayed.

Thus, there exists a need for a compass compensation system capable of compensating for and recovering from abrupt and significant changes in vehicular magnetism and an improved system which can efficiently compensate for the initial vehicular magnetism of a new vehicle.

SUMMARY OF THE INVENTION

The present invention provides a significantly improved compass system providing automatic calibration of a vehicle's compass which compensates for abrupt and significant changes in vehicular magnetism during normal operation of the vehicle. The present invention also provides a method by which to efficiently compensate for the initial vehicular magnetism of a new vehicle. In the preferred embodiment of the present invention, a system is provided which compensates for all changes in vehicle magnetism which adversely affect compass operation.

The present invention includes a magnetic field sensor for mounting within a vehicle to provide signal information representing the earth's magnetic field sensed within the vehicle. The sensor is coupled to an electrical circuit for sampling the data provided by the sensor and for determining when a change in vehicular magnetism has occurred. The circuit additionally has means for compensating the sensor for the effects of vehicular magnetism so that accurate heading information can be displayed on a display coupled to said circuit. In the preferred embodiment of the invention, the electrical circuit includes a microprocessor programmed to analyze incoming sensed vehicle heading data and to quickly provide appropriate compensation signals to effect the display of accurate heading information.

These and other features, advantages and objects of the present invention will be further understood and appreciated by those skilled in the art by reference to the following specification, claims and appended drawings.

BRIEF DESCRIPTION OF THE DRAWINGS

FIG. 1 is a fragmentary perspective view of a vehicle including a compass embodying the present invention;

FIG. 2 is an electrical circuit diagram partly in block and schematic form of the compass system embodying the present invention;

FIG. 3 is a graph illustrating the ideal signal from the magnetic field sensor and the signal after a change in vehicle magnetism.

DETAILED DESCRIPTION OF THE PREFERRED EMBODIMENT

Figure 4A:
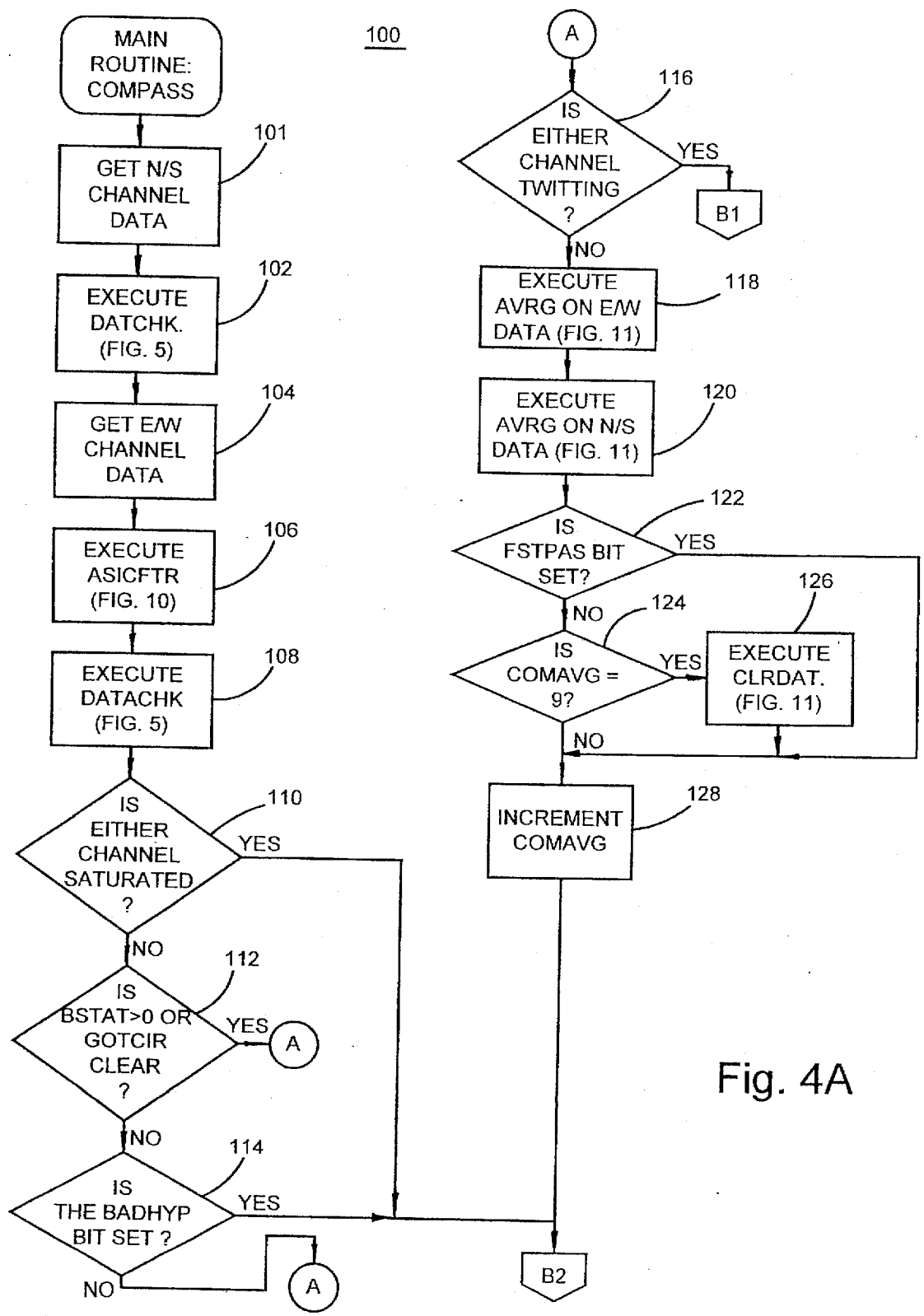
FIGS. 4-22 are the flow diagrams for the programming of the microprocessor employed in the compass system of the preferred embodiment of the present invention.

In FIG. 1, there is shown a vehicle 10 such as an automobile which includes a control and display module 11 adapted to be integrally mounted to the roof 12 of the vehicle during manufacture, although it could be separately added at a later time. The module 11 is centered near the top edge of windshield 14 typically above the rearview mirror 15 and includes a pair of map reading lamps 16 having switches 18 for operating lamp means positioned behind lenses 20 which in turn direct illumination into the lap area of either the driver or passenger side of the vehicle depending on which switch is actuated. The center of the module includes a trainable garage door opener transmitter 22 of the type disclosed in allowed U.S. Pat. No. 5,442,340, filed Apr. 30, 1993, and entitled TRAINABLE TRANSMITTER WITH OUTPUT ATTENUATION CONTROL. This trainable transmitter can learn the RF frequency, modulation scheme, and security code of up to three existing remote transmitters. Thus, module 11 including trainable transmitter 22, can replace three separate remote control transmitters usually loosely stored in the vehicle. The transmitter includes three control switches 23, 24, and 25 and an indicator LED 26 for the display of training prompting information to the vehicle operator. Module 11 may also include an electrical sunroof control switch 28 and other vehicle accessory controls.

Module 11 also includes a separate display panel 30 which includes display indicators 31–34 for displaying vehicle operating parameters such as engine coolant temperature, oil pressure, generator, and fuel warnings or the like, which can either be displayed in a digital graphic or alphanumeric format or as warning lights. The center of display module 30 includes a digital display 36 providing, in one embodiment of the invention, a sixteen point display 38 of the vehicle heading. Module 11 also includes the compass circuit shown in FIG. 2 which is appropriately mounted therein and display control switches 40, 42, and 44.

The compass system of the present invention is shown schematically in FIG. 2 and includes a magnetic field sensor 46 which is a flux-gate sensor in the preferred embodiment, although other types of sensors may be employed. An electrical interface circuit 48 couples sensor 46 to a microprocessor 50. Microprocessor 50 is also coupled to a digital speedometer 51, a non-volatile memory circuit 52, a display driver 54, and a display 56. Also shown is a power supply circuit 57 which provides operating voltages to all of the components of the compass system. In the preferred embodiment, microprocessor 50 is an HC05 8-bit microprocessor manufactured by the Motorola Corporation. The interconnection and functioning of these circuits is now described.

Sensor 46 includes an annular core 58 around which is wound a primary winding 60, a secondary East/West sensing winding 62, and a secondary North/South sensing winding 64. Terminal 78 of circuit 48 is held at 2.5 volts and provides an intermediate reference ground for the windings of sensor 46. Primary winding 60 is driven by zero to five volt signals supplied from terminal 66 of circuit 48 to selectively drive annular core 58 into saturation. Secondary sensing windings 62 and 64 supply signals representing the magnetic field sensed within the vehicle which are supplied to terminals 68 and 70, respectively, of circuit 48. Circuit 48 essentially serves as an interface between sensor 46 and microprocessor 50, performing the same functions as the corresponding individual circuit components detailed in U.S. Pat. No. 4,953,305, issued on Aug. 4, 1990, entitled VEHICLE COMPASS WITH AUTOMATIC CONTINUOUS CALIBRATION, assigned to the present assignee and incorporated herein by reference. The interface circuit 48 preferably is an application specific integrated circuit (ASIC) essentially incorporating the individual circuits of the prior interface circuit in a conventional manner to reduce the cost of the compass system.

Circuit 48 converts the analog signals to eight bit digital signals (count values) which represent the magnetic field strength, in milligauss, detected by the two sensor windings 62 and 64 representing the two compass channels. Each count value represents five milligauss of magnetism in the preferred embodiment of the present invention. These digital signals are supplied via terminal 72 to terminal 76 of microprocessor 50 over serial communication line 74. After processing these signals, microprocessor 50 supplies compass compensation correction information, if needed, to circuit 48 by means of the same serial communication line 74. Terminal 80 of microprocessor 50 is coupled to non-volatile memory circuit 52 such that, in part, updated compensation information may be retained. Microprocessor 50 is also coupled via terminal 82 to display driver 54 for providing signals to display 56 for displaying the heading of the vehicle. Display 56 is a sixteen point display in the preferred embodiment, although it can be any type of display including an alphanumeric or graphic type display.

Microprocessor 50 processes the digital signals supplied by circuit 48 and generates compass compensation signals if necessary. These signals are supplied to circuit 48 via serial communication line 74. After conversion from digital to analog, these correctional signals are supplied by circuit 48 directly to secondary sensing windings 62 and 64 via terminals 68 and 70, respectively. In particular, DC currents are supplied which create a static magnetic field that interacts with the field being measured by sensor 46. For a properly calibrated compass, this combined field eliminates the effects of any magnetic interferences such that sensor 46 provides signals representative only of the magnetic field of the earth so that accurate heading information is provided. Although this method of compass compensation is employed in the preferred embodiment of the present invention, other embodiments may provide different means of correction. For example, circuit 48 may supply voltage or frequency signals to compensate sensor 46 which may be any type of magnetic field sensor. Furthermore, correction may be achieved by compensating the signals supplied to the display 56 instead of altering the sensing of the magnetic field itself, as described above.

The digital signals supplied by circuit 48 to microprocessor 50, representing the magnetic field sensed by the North/South and East/West channels of sensor 46, can be plotted on an X-Y coordinate plane, as shown in FIG. 3. The magnetic field strength, in milligauss, of the East/West channel is represented by the X axis, and the magnetic field strength, in milligauss, of the North/South channel is represented by the Y axis. For a properly calibrated compass, the plotted channel data creates a perfect circle around the origin of the coordinate plane when the vehicle travels in a 360° loop, as indicated by graph A. The radius of the circle represents the earth's magnetic field strength, and the vehicle's compass heading at a particular time during travel is represented by a point on the circle. If a change in vehicle magnetism occurs, the magnetic field sensed by the compass channels when the vehicle is heading in a given direction will be either greater or lesser than that expected for a vehicle with no magnetic interference. As such, the plot of digital sensor data will be shifted away from the origin in some direction, and will result in a circle such as shown by graph B when the vehicle travels a 360° loop. In addition to the interference caused by vehicular magnetism, the perfect circle of graph "A" may actually be elliptical before compensation. There are two reasons for this elliptical effect. First, the construction of the vehicle generally results in more vehicle mass along one axis of compass sensing which causes the earth's field to penetrate the vehicle differently in different directions. This causes the channels of sensor 46 not to react uniformly to the earth's field as the vehicle travels a 360° loop. Second, the construction of a flux-gate sensor generally is such that the diameter of one sensing winding is larger than the other, similarly causing the channel windings to react differently to the earth's field as the vehicle travels a 360° loop.

The programming for microprocessor 50 analyzes the sensor data supplied to microprocessor 50 in terms of its position on the X-Y coordinate plane and corrects the compass if any of the above-mentioned interferences are detected. The origin of the coordinate plane when the compass is properly calibrated is positioned at the center of the range of sensor data measurement which, for the 8-bit microprocessor of the preferred embodiment, is at 80 hexadecimal for each sensor channel.

In the preferred embodiment of the present invention, the programming of microprocessor 50 compensates for all changes in vehicular magnetism which adversely affect compass operation. In order to compensate for a change in vehicle magnetism which causes the signal levels of the digital sensor data to be within a predetermined threshold or tolerance of the data of a properly calibrated compass, the programming of the preferred embodiment implements the compass compensation system of the above-identified U.S. Pat. No. 4,953,305, assigned to the present Assignee and incorporated herein by reference. However, if a change in the vehicle's magnetism is abrupt and significant such that the signal levels of the digital sensor data are outside of the above-mentioned predetermined threshold, then the programming of microprocessor 50 calibrates the compass as now briefly described. First, the program waits until a predetermined distance has been travelled by the vehicle to ensure that the shift in vehicle magnetism is not a temporary shift due to "bad" sensor data or driving near a magnetized structure such as a bridge. If this predetermined distance is travelled while the signal levels of the digital sensor data continue to be outside of the above-mentioned threshold, then the program initiates the process of recovering from the shift in vehicle magnetics. The recovery process begins by shifting the X-Y coordinate plane such that the position of the last detected signal levels within the threshold coincide with the position of the signal levels detected after the above-mentioned predetermined distance has been travelled by the vehicle. If the vehicle has not changed its direction of travel since a shift in vehicle magnetism was first detected, this data manipulation enables the compass to immediately display accurate heading information. However, the program continues the recovery process in case the direction of travel of the vehicle did change since a shift in vehicle magnetism was first detected.

The program analyzes the sensor data and waits until the vehicle changes its direction of travel a predetermined amount such that the plot of digital sensor data creates an arc ∝ of predetermined length and spanning a predetermined angle, as shown with the solid line of graph B of FIG. 3. In the preferred embodiment, this arc is equivalent to a change of at least about 80° or more in compass heading. The program stores in memory the "starting" point 90 of the arc, the "midpoint" or intermediate point 91 of the arc which is equivalent to a change of 45° in the preferred embodiment, and the "ending" point 92 of the arc. Next, the program, using these points, determines the center 93 of the arc, designated by the coordinates (VREF2, VREF1), which has a radius that is equivalent to the radius of the circle for a properly calibrated compass. The X-Y coordinate plane is then shifted such that its origin coincides with the center of the arc. Next, compass compensation signals are generated based on the extent which the X-Y coordinate plane was shifted throughout the recovery process. In the preferred embodiment, these signals are applied to sensor 46 through interface circuit 48 to calibrate the compass. A detailed description of the programming for microprocessor 50 to provide this system operation is now provided in connection with the flowcharts of FIGS. 4 to 22.

In discussing the flow diagrams of FIGS. 4–22 for the programming of microprocessor 50, the following symbols and their definitions are used:

BSTAT variable: Indicates the status of the calibration system for an abrupt and significant change in vehicle magnetics. Is zero before detection of a change in magnetism.

COMAVG variable: Counter used to determine when 16 quality sensor channel readings have been collected.

CSTAT variable: Indicates the status of the compass compensation system of U.S. Pat. No. 4,953,305.

DASTAT variable: Represents a set of flags which pertain to the equality of a pair of sensor channel readings. Is zero if the data is of highest quality.

VREF1 variable: Stores the center of the North/South channel waveform.

VREF2 variable: Stores the center of the East/West channel waveform.

VCOMP1 variable: Represents the amount of compensation current required for the North/South sensor channel.

VCOMP2 variable: Represents the amount of compensation current required for the East/West sensor channel.

E1 variable: A 6 byte buffer used to store the North/South channel data and to accumulate and store an average thereof.

E2 variable: A 6 byte buffer used to store the East/West channel data and to accumulate and store an average thereof.

E1C & E2C variables: Store the coordinates of the center of each sensor channel waveform.

E1OLD & E2OLD variables: Store averaged channel data from an interval when all of the readings are of good quality, and establishes the last good heading before a shift in the vehicle magnetics.

E1LOW & E2LOW variables: Store the starting point of the arc.

E1MID & E2MID variables: Store the midpoint of the arc.

E1HI & E2HI variables: Store the ending point of the arc.

LASTE1 & LASTE2 variables: Store averaged channel data from one interval prior to the current average.

HYPTIMER variable: Counter that indicates the distance travelled by the vehicle while the plot of sensor data is outside a threshold.

ATEMP & XTEMP variables: Temporary storage for the accumulator and index register of microprocessor 50.

HYPOT variable: Stores the radius of the calibrated circle which is equivalent to the earth's magnetic field strength.

ANG variable: Stores the heading of the vehicle.

SPEED variable: Stores the current vehicle speed.

BADDAT variable: Counter which is clear when 16 consecutive quality sensor readings have been collected.

GAIN variable: Stores the ratio of one channel span to the other channel span.

LL1 & LL2 variables: Stores the lower limit on each channel in which to search for potential centers of the arc.

UL1 & UL2 variables: Stores the upper limit on each channel in which to search for potential centers of the arc.

GOTCIR flag: Set when all four crossings have been identified for purposes of the compass compensation system of U.S. Pat. No. 4,953,305.

BADHYP flag: Set if the current sensor signal levels are outside of a threshold formed around the circle of a properly calibrated compass.

FSTPAS flag: Clear while the first average channel data is being collected.

GOTMID flag: Set when the arc span has exceeded 45°.

TWOPTS flag: Set when two consecutive sensor data averages are within 3 counts of each other.

GOTDIST flag: Set when the arc span has exceeded 80°.

GOODC flag: Set when the distance between a potential center and the midpoint is within a tolerance of the radius of a calibrated circle.

NVMWRT flag: Set when a write to nonvolatile memory is required.

TWIT1 & TWIT2 flags: Set if the data from the corresponding channel (stored in variable E1 or E2) has undergone a significant change which is greater than the expected change in compass heading caused by turning the vehicle.

WOWTWO flag: Set if 16 consecutive quality sensor readings have been collected. Four of the variables employed in the programming of microprocessor 50 are of particular interest and are now described in more detail. Variable VREF1 stores the center of the North/South channel waveform and variable VREF2 stores the center of the East/West channel waveform. Both variables are approximately 80 hexadecimal when the compass is calibrated in the preferred embodiment. Variables VREF1 and VREF2 are adjusted whenever a change in vehicle magnetics occurs such that the extent of shifting of the origin of the X-Y coordinate plane, representative of the magnitude of the change in vehicle magnetics, may be determined. If the change in vehicle magnetism causes either of the VREF variables to exceed a predetermined value, then the program calculates values for variables VCOMP1 and VCOMP2 which represent the amount of compensation current to be supplied to the North/South and East/West channels of sensor 46, respectively. Application of current to sensor 46 from magnetometer 48 counteracts the effects of vehicle magnetism so that the origin of the X-Y coordinate plane can be shifted back to the center of the range of sensor data measurement which, for the 8-bit microprocessor of the preferred embodiment, is at 80 hexadecimal for each sensor channel. The program calculates values for the VCOMP variables and applies current to sensor 46 during execution of the compass compensation system of U.S. Pat. No. 4,953,305 and during execution of the MOVE2PT subroutine 496 which is described in detail below in connection with FIGS. 16A and 16B of the programming for microprocessor 50.

Referring first to FIGS. 4A–4E, shown is the main routine 100 of the compass program which is called every ⅛ second by microprocessor 50. Beginning with block 101, the program collects data from circuit 48 representing the North/South channel of sensor 46 and stores it in a six byte buffer labelled E1. Next, block 102 executes the DATCHK subroutine 240 which analyzes the North/South channel data collected and sets certain flags corresponding thereto. The DATCHK subroutine 240 is described in greater detail below in connection with FIGS. 5A and 5B. Upon return from the DATCHK subroutine, the program proceeds to block 104 which collects data from circuit 48 representing the East/West channel of sensor 46 and stores it in a six byte buffer labelled E2. Next, block 106 executes the ASICFTR subroutine 398 which eliminates any elliptical effect in the plot of sensor data, caused by the construction of the fluxgate, by equalizing the gain of the two channels. The ASICFTR subroutine 398 is described in greater detail below in connection with FIG. 10. Upon return from the ASICFTR subroutine, the program proceeds to block 108 which executes the DATCHK subroutine 240 of FIGS. 5A and 5B which analyzes the East/West channel data collected and sets certain flags corresponding thereto.

Upon return from the DATCHK subroutine, block 110 determines if the data from either the North/South channel or the East/West channel is saturated as indicated by a flag set in the DATCHK subroutine 240. Saturation results when the data exceeds or is close to exceeding the measurement range of the current X-Y coordinate system, and is remedied by shifting the origin of the coordinate system towards the coordinates of the compass data. If either channel is saturated, then the program proceeds to block 130 of FIG. 4B. If neither channel is saturated, then block 112 determines if variable BSTAT is greater than zero or if flag GOTCIR is clear. Variable BSTAT indicates the status of the compensation process for an abrupt and significant change in vehicle magnetism and is zero before a change is detected. Flag GOTCIR is set when a full circle of data has been collected after the compensation system of U.S. Pat. No. 4,953,305 has calibrated the compass, and ensures that the calibration numbers calculated therein are correct. If block 112 determines that either variable BSTAT is greater than zero or flag GOTCIR is clear, then the program proceeds to block 116. If block 112 determines that neither condition is true, then block 114 determines if the BADHYP flag is set. This flag is set in the DATCHK subroutine 240 of FIGS. 5A and 5B if the current sensor data is plotted outside of a predetermined threshold formed around the circle of a calibrated compass.

Figure 4B:
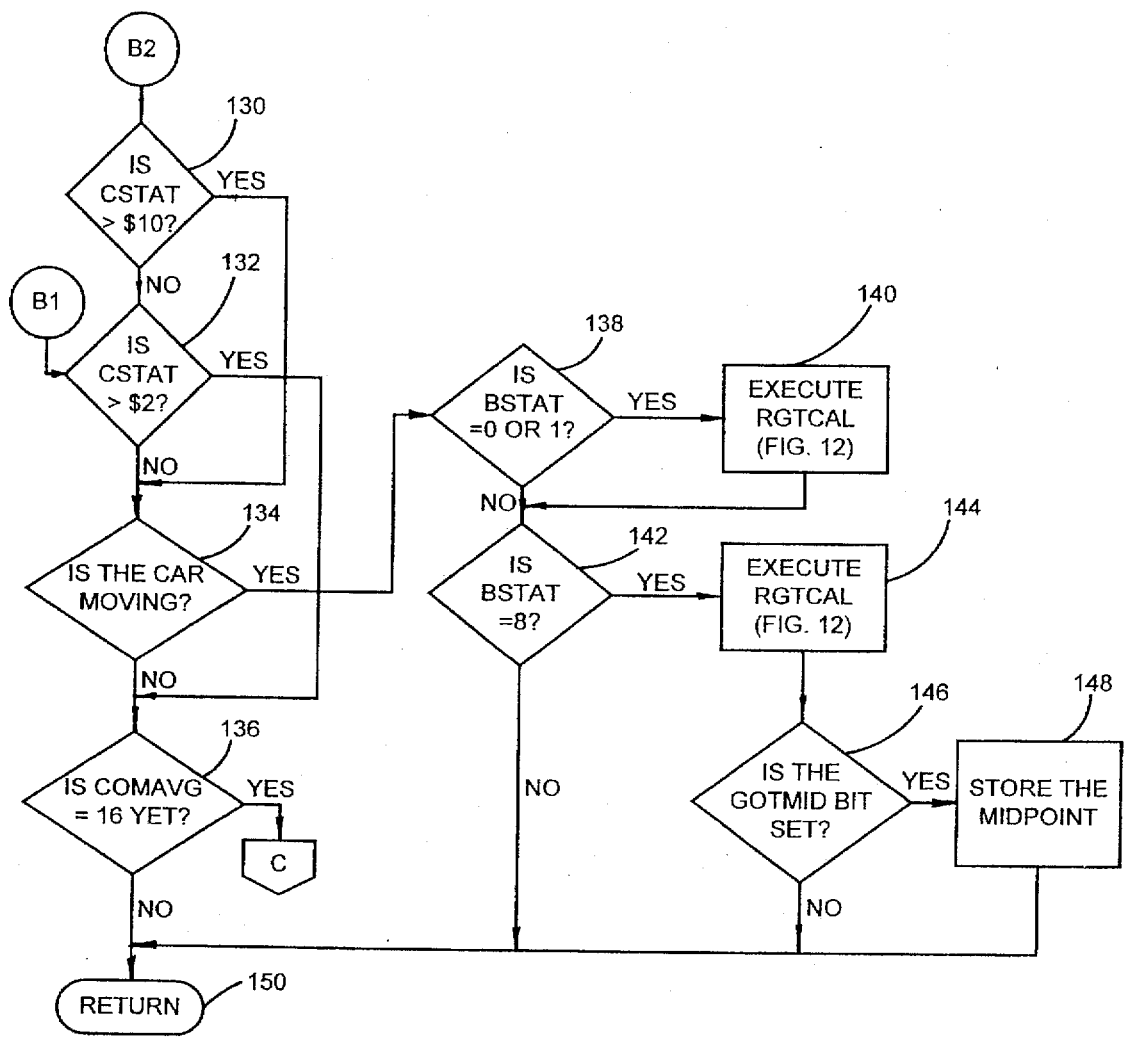

If the BADHYP flag is set, the program proceeds to block 130 of FIG. 4B. If the BADHYP flag is not set, then the program proceeds to block 116 which determines if either of the flags TWIT1 or TWIT2 are set. These flags correspond to the two compass channels of sensor 46, and each is set in the DATCHK subroutine 240 of FIGS. 5A and 5B if the compass data received from its corresponding compass channel has undergone a significant change which is greater than the expected change in compass heading caused by turning the vehicle. If block 116 determines that either flag is set, then the program proceeds to block 132 of FIG. 4B. If neither flag is set, then block 118 executes the AVRG subroutine 422, described in detail below in connection with FIG. 11, which adds the current East/West channel data in buffer E2 to a running total stored in buffer E2 so that a two-second average can subsequently be calculated.

Upon return from the AVRG subroutine 422, block 120 executes the same subroutine to add the current North/South channel data in buffer E1 to a running total stored in buffer E1 so that a two-second average can subsequently be calculated. Upon return therefrom, block 122 determines if the FSTPAS flag is set. This flag is clear during calculation of the first two-second average of channel data after power-up of the compass. If the FSTPAS flag is set, then the program proceeds to block 128. If the flag is not set, then block 124 determines if variable COMAVG is equal to nine. This variable is a counter which indicates the number of times the AVRG subroutine 422 has averaged sensor channel dam. If variable COMAVG is equal to nine, then block 126 executes the CLRDAT subroutine 432, described in detail below in connection with FIG. 11, which clears the averaged compass data. Blocks 124 and 126 enable the system to stabilize itself after power-up so as to ensure proper data manipulation. Upon return from the CLRDAT subroutine, or if block 124 determines that variable COMAVG is not equal to nine, then block 128 increments counter variable COMAVG, and the program proceeds to block 130 of FIG. 4B.

Block 130 of FIG. 4B determines if variable CSTAT, which indicates the status of the compass compensation system as disclosed in U.S. Pat. No. 4,953,305, is less than 10 hexadecimal. Variable CSTAT is less than 10 when a first circle of data has not yet been collected such that the system is still looking for crossings. If variable CSTAT is less than 10 hexadecimal, then the program proceeds to block 134. If variable CSTAT is not less than 10 hexadecimal, then the program proceeds to block 132. Alternatively, the program may branch to block 132 from block 116 of FIG. 4A, as described above. Block 132 determines if variable CSTAT is greater than 2 hexadecimal indicating that the compensation system has completed its set-up procedures. If it is, then the program proceeds to block 136. If variable CSTAT is not greater than 2 hexadecimal, then block 134 checks data representing vehicle speed from source 51 to determine if the vehicle is moving. If the vehicle is not moving, then it is undesirable to continue the execution of any of the compass compensation systems because of possible magnetic interference caused by stationary objects. If block 134 determines that the vehicle is not moving, then the program proceeds to block 136 which determines if counter variable COMAVG is equal to sixteen which would indicate that the AVRG subroutine 422 has averaged sensor channel data sixteen times and that it is time to process that average. If counter variable COMAVG is equal to sixteen, then the program proceeds to block 152 of FIG. 4C. If not, then the main routine 100 of the compass program is exited via block 150 and the program returns to perform other tasks, such as updating the display, until the main routine is called again 1/8 second later.

Referring again to block 134, if it determines that the vehicle is moving, then the program proceeds to block 138 which determines if variable BSTAT is equal to zero or one which would indicate that the programming is either in the detection mode or the early stages of recovering from an abrupt and significant change in vehicle magnetism. If it is, then the program proceeds to block 140 which executes the AUTCAL subroutine 440 which is described in the compass correction disclosure of U.S. Pat. No. 4,953,305. This subroutine is also described in greater detail below in connection with FIG. 12. Upon return from the AUTCAL subroutine, or if block 138 determines that variable BSTAT is not equal to zero or one, then the program proceeds to block 142 which determines if variable BSTAT is equal to eight which would indicate that a starting point for an arc is established and the compass compensation system is currently waiting to calculate the midpoint of the arc. As described above, this arc represents the amount of change in the direction of travel of the vehicle after the vehicle travelled a predetermined distance after microprocessor 50 determined that sensor data signal levels are outside a predetermined threshold. If variable BSTAT is not equal to eight, then the program proceeds to block 150 which exits the main compass routine.

If variable BSTAT is equal to eight, then block 144 executes the RGTCAL subroutine 446 which determines the angle spanned by the arc. This subroutine is described in greater detail below in connection with FIG. 12. Upon return from the RGTCAL subroutine, block 146 determines if the GOTMID flag is set indicating that the vehicle has changed its direction of travel a predetermined amount which corresponds to an arc span in excess of 45°. If the flag is set, then the midpoint has been established and block 148 stores the midpoint in memory. After block 148, or if block 146 determines that the GOTMID flag is not set, the program proceeds to block 150 which exits the main compass routine.

Figure 4C:
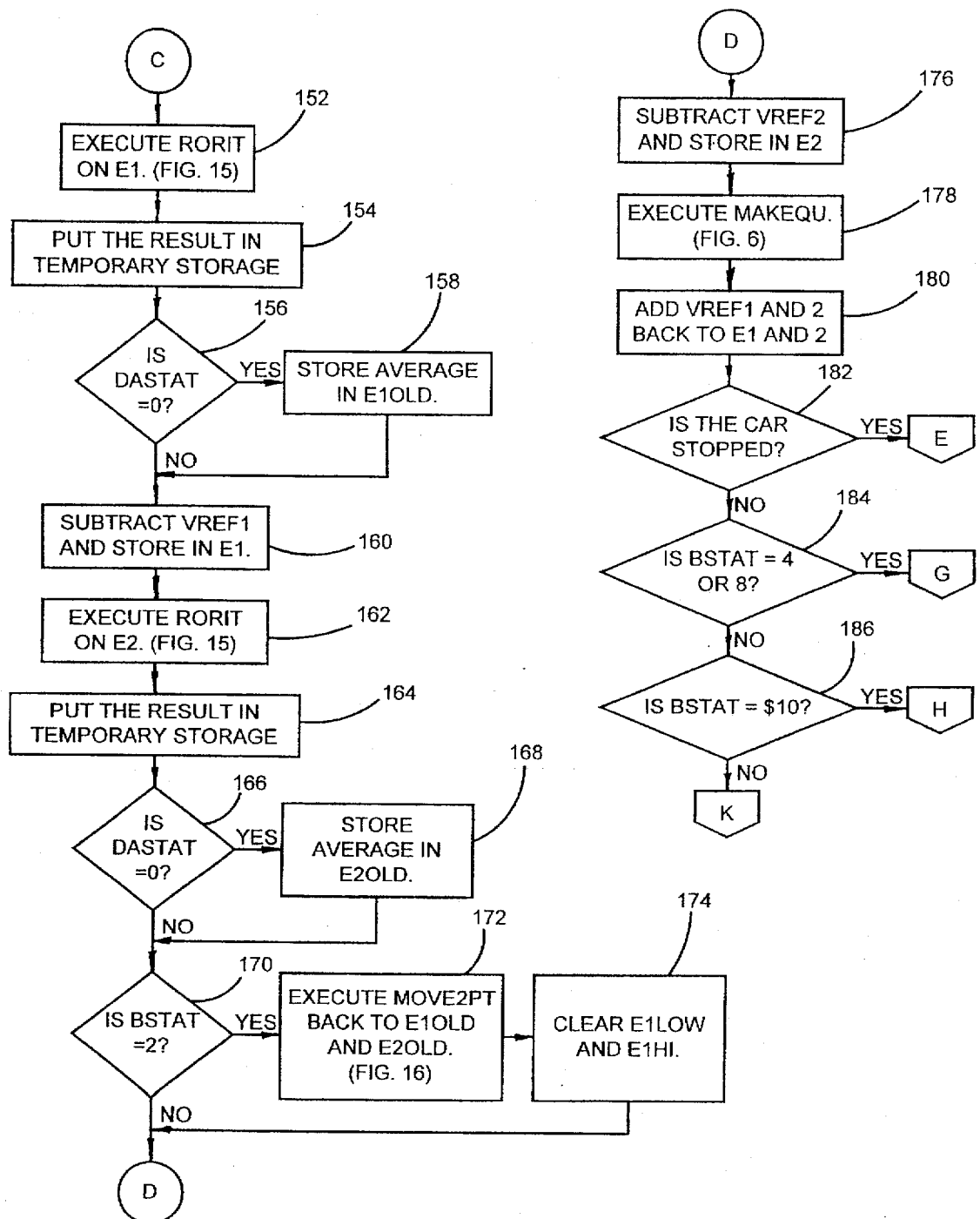
Figure 5A:
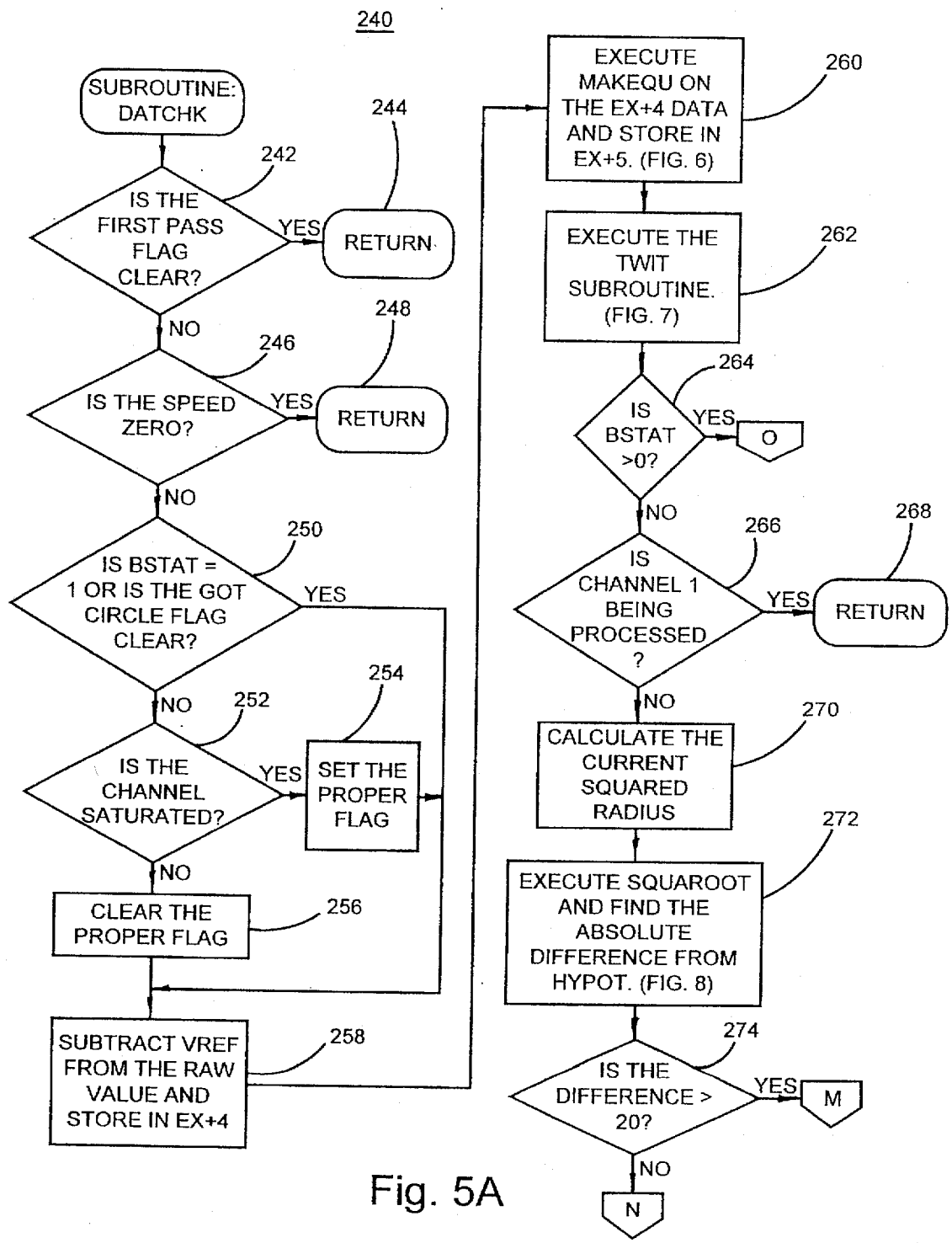
Figure 5B:
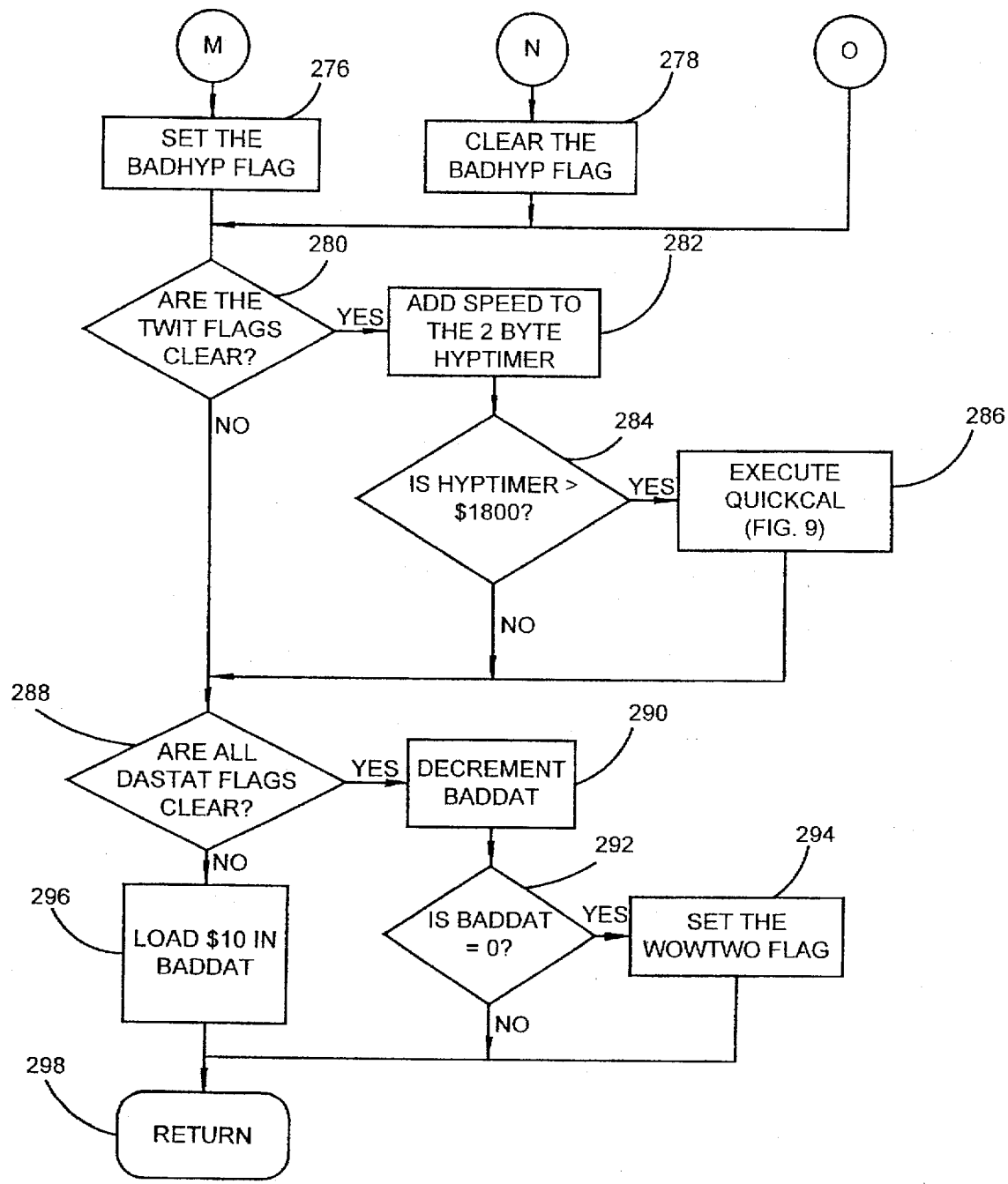

Referring to FIG. 4C, block 152 executes the RORIT subroutine 486 using the North/South channel data stored in buffer E1. The program branches to block 152 only when block 136 of FIG. 4B determines that counter variable COMAVG is equal to sixteen such that it is time to process the running total summed during the AVRG subroutine 422 of FIG. 11. The RORIT subroutine, described in detail below in connection with FIG. 15, calculates the average of the running total stored in buffer E1 by dividing it by the number of times the data has been summed, and stores the result in buffer E1. Upon return from the RORIT subroutine, block 154 stores the calculated average in temporary storage. Next, block 156 determines if variable DASTAT is equal to zero. Variable DASTAT is zero when all of the flags handled in the DATCHK subroutine 240 of FIGS. 5A and 5B are not set indicating that the compass data is "good" and free of noise.

If variable DASTAT is equal to zero, then block 158 stores the current North/South channel data average in variable E1OLD which, along with variable E2OLD, is used to establish the last "good" averaged heading before a shift in vehicle magnetics. Block 158 enables variable E1OLD to continuously be updated until a change in vehicle magnetics is detected. After block 158, or if block 156 determines that variable DASTAT is not equal to zero, then block 160 subtracts variable VREF1 from the current North/South channel data average in buffer E1 and stores the result in buffer E1. Variable VREF1 is the center of the North/South channel waveform, and is approximately 80 hexadecimal when the compass is calibrated in the preferred embodiment. Subtraction of VREF1 from the channel data changes the channel data to two's compliment numbers to simplify certain calculations performed in subsequent blocks. Next, block 162 executes the RORIT subroutine 486 of FIG. 15 using the East/West channel data stored in buffer E2. The RORIT subroutine calculates the average of the running total summed during the AVRG subroutine 422 and stored in buffer E2 by dividing it by the number of times the data has been summed, and the result is stored in buffer E2. Upon return from the RORIT subroutine, block 164 stores the calculated average in temporary storage.

Next, block 166 determines if variable DASTAT is equal to zero indicating that the compass data is "good" and free of noise. If variable DASTAT is equal to zero, then block 168 stores the current East/West channel data average in variable E2OLD which, as mentioned above, is used to establish the last "good" averaged heading before a shift in vehicle magnetics. Block 168 enables variable E2OLD to continuously be updated until a change in vehicle magnetics is detected.

After block 168, or if block 166 determines that variable DASTAT is not equal to zero, then block 170 determines if variable BSTAT is set to two. Variable BSTAT is set equal to two after the X-Y coordinate plane has been shifted such that the current averaged heading position, after a change in vehicle magnetics has been detected, coincides with the origin. This shifting is performed during execution of the AUTCAL subroutine 440 of FIG. 12 in block 140 of FIG. 4B when variable CSTAT is equal to 2. If variable BSTAT is equal to two, then block 172 executes the MOVE2PT subroutine 496 to shift the X-Y coordinate plane such that the current averaged heading position coincides with the last "good" averaged heading acquired before a shift in vehicle magnetics which is stored in E1OLD and E2OLD. This provides the best estimate of the current heading of the vehicle based on the assumption that the vehicle did not change its direction of travel since the shift in vehicle magnetics was detected. The MOVE2PT subroutine 496 is described in greater detail below in connection with FIGS. 16A and 16B. Upon return from the MOVE2PT subroutine, block 174 clears variables E1LOW and E1HI. As discussed later, variables E1LOW and E2LOW are the coordinates of the starting point of the arc and variables E1HI and E2HI are the coordinates of the ending point of the arc. Clearing variables E1LOW and E1HI in block 174 indicates that both sets of coordinate variables need to have current data stored in them. After block 174, or if block 170 determines that BSTAT is not equal to two, then the program proceeds to block 176.

Block 176 of FIG. 4C subtracts variable VREF2 from the current East/West channel data average in buffer E2 and stores the result in buffer E2. Variable VREF2 is the center of the East/West channel waveform, and is approximately 80 hexadecimal when the compass is calibrated in the preferred embodiment. Subtraction of VREF2 from the channel data changes the channel data to two's compliment numbers to simplify certain calculations performed in subsequent blocks. Next, block 178 executes the MAKEQU subroutine 300 which eliminates any elliptical effect in the plot of sensor data caused by the construction parameters of the vehicle. The MAKEQU subroutine 300 is described in greater detail below in connection with FIG. 6. Upon return from the MAKEQU subroutine, block 180 adds variables VREF1 and VREF2 to buffers E1 and E2, respectively. This changes the channel data from two's compliment numbers back to all positive numbers to simplify the calculations performed in subsequent blocks. After block 180, the program proceeds to block 182 which looks at the output of speed sensor 51 (FIG. 2) to determine if the vehicle is travelling or not. If the vehicle is not moving, then the program proceeds to block 188 of FIG. 4D. If block 182 determines that the vehicle is moving, then block 184 determines if variable BSTAT is equal to four or eight. Variable BSTAT is set equal to four when the current averaged heading position has been shifted to the last "good" averaged heading position stored in E1OLD and E2OLD, and begins a process whereby the program waits until the vehicle is travelling in close to the same direction for four seconds to establish a starting point for the arc. Variable BSTAT is set equal to eight when the vehicle has travelled in close to the same direction for four seconds, and begins the process whereby the program waits until an arc of 45° is travelled by the vehicle. If block 184 determines that variable BSTAT is equal to four or eight, then the program proceeds to block 196 of FIG. 4D. If variable BSTAT is not equal to four or eight, then block 186 determines if variable BSTAT is equal to 10 hexadecimal. Variable BSTAT is set equal to 10 hexadecimal when an arc of 45° has been travelled and the midpoint has been established, and begins the process whereby the program waits until the vehicle has changed its direction of travel a predetermined amount which corresponds to at least an 80° arc in the preferred embodiment. If block 186 determines that variable BSTAT is equal to 10 hexadecimal, then the program proceeds to block 208 of FIG. 4D. If variable BSTAT is not equal to 10 hexadecimal, then the program proceeds to block 236 of FIG. 4E.

Figure 4D:
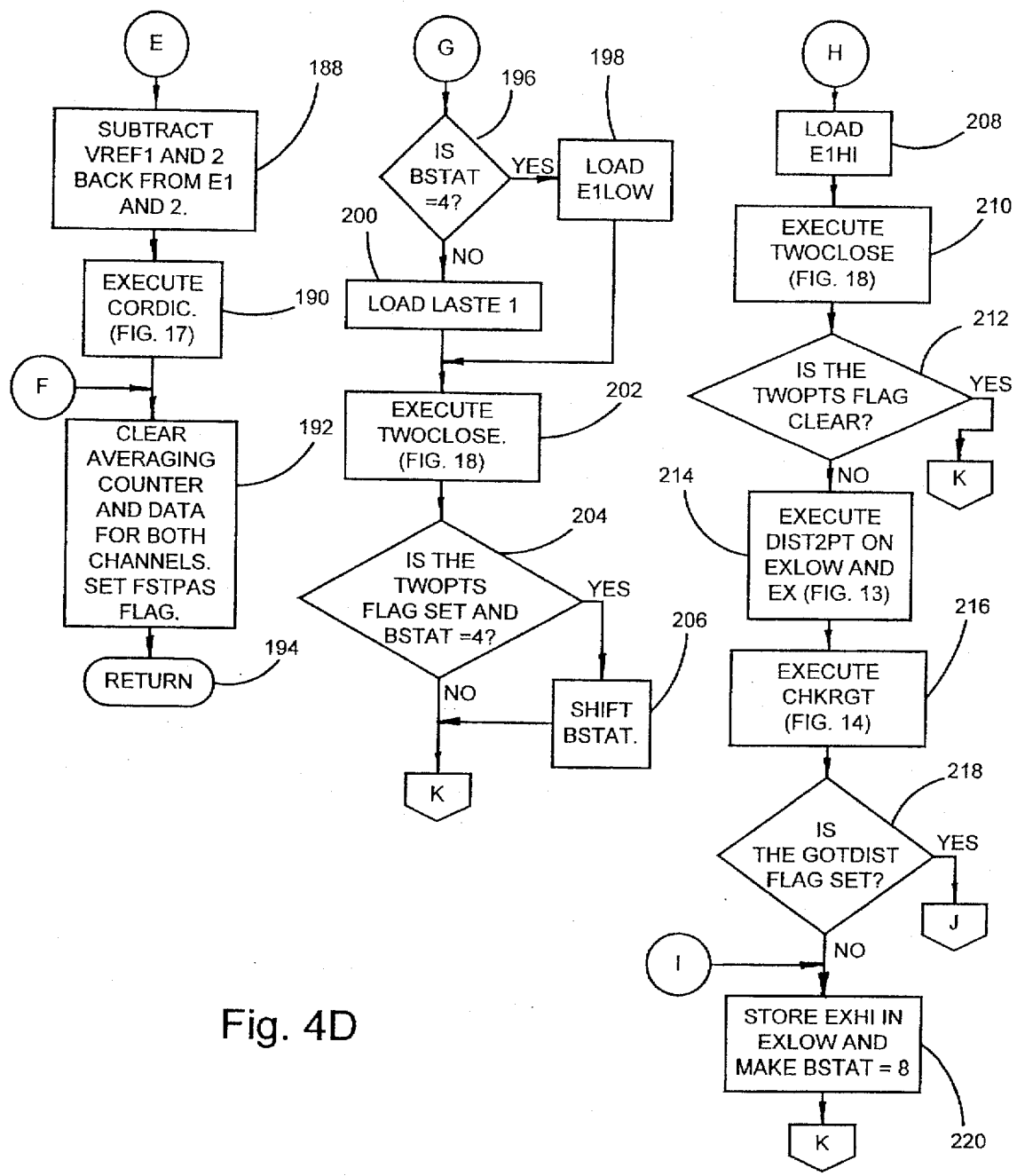

Referring to FIG. 4D, the program enters block 188 if block 182 of FIG. 4C determined that the vehicle was not moving. Alternatively, the program may branch to block 188 from block 236 or 238 of FIG. 4E, as described below. Block 188 subtracts variables VREF1 and VREF2 from buffers E1 and E2, respectively, to change the compass channel data to two's compliment numbers to simplify certain calculations performed in subsequent blocks. Next, block 190 executes the CORDIC subroutine 544 which calculates the heading of the vehicle using the arctangent function. The CORDIC subroutine 544 is described in greater detail below in connection with FIG. 17. Upon return from the CORDIC subroutine, the program proceeds to block 192. Alternatively, the program may branch to block 192 from block 238 of FIG. 4E, as described below. Block 192 clears counter variable COMAVG and buffers E1 and E2 to prepare microprocessor 50 for the next pass through the main compass routine, and sets the FSTPAS flag to indicate that the stabilization process of blocks 124 and 126 of FIG. 4A is no longer necessary. The program then exits the main compass routine via block 194.

Block 196 of FIG. 4D is entered if block 184 of FIG. 4C determined that variable BSTAT was equal to four or eight. Block 196 determines if variable BSTAT is equal to four indicating that a starting point for the arc must still be established. If it is, the program proceeds to block 198 which loads variable E1LOW, which is zero upon first pass and subsequently set in block 202, into the accumulator of microprocessor 50 for processing in block 202. If block 196 determines that variable BSTAT is not equal to four, indicating that it must be equal to eight and that the starting point has been established, then block 200 loads variable LASTE1 into the accumulator of microprocessor 50 for processing in block 202. Variables LASTE1 and LASTE2 represent the averaged channel data from one interval prior to the current average. After block 198 or 200, the program proceeds to block 202 which executes the TWOCLOSE subroutine 550, described in detail below in connection with FIG. 18, which determines whether the data loaded for processing in block 198 or 200 is within a certain tolerance of the current averaged data such that the vehicle travelled in close to the same direction for four seconds. This is used to establish the starting point for the arc which is stored in E1LOW and E2LOW. The TWOCLOSE subroutine is executed even when a staffing point has previously been established (i.e., when BSTAT=8) because, while the program is waiting for the vehicle to turn and span a 45° arc, it continuously updates its starting point so that it is the most recent. When the vehicle is actually turning through a 45° arc, the starting point will not be updated because the points will not be within the tolerance due to the turning of the vehicle. Furthermore, once an arc of 45° is generated and a midpoint established, BSTAT is set equal to hexadecimal 10 and the starting point is fixed. Upon return from the TWOCLOSE subroutine 550, block 204 determines if the TWOPTS flag is set, indicating that a starting point has been established or updated, and whether variable BSTAT is equal to four. If both conditions of block 204 are true, then block 206 increments variable BSTAT to eight. After block 206, or if block 204 determines that both conditions are not true, then the program proceeds to block 236 of FIG. 4E.

Block 208 of FIG. 4D is entered if block 186 of FIG. 4C determined that variable BSTAT was equal to 10 hexadecimal. Block 208 loads variable E1HI, which is one of the coordinates for the ending point of the arc, into the accumulator of microprocessor 50 for processing in block 210. Block 210 executes the TWOCLOSE subroutine 550, described in detail below in connection with FIG. 18, which determines if the vehicle has travelled in close to the same direction for four seconds. Upon return from the TWOCLOSE subroutine, block 212 determines if the TWOPTS flag is clear. If the flag is clear, indicating that the vehicle has not travelled in close to the same direction for four seconds, then the program proceeds to block 236 of FIG. 4E. If block 212 determines that the TWOPTS flag is set, then block 214 executes the DIST2PT subroutine 454 which determines the distance between the current point, stored in variables E1 and E2, and the starting point of the arc stored in variables E1LOW and E2LOW. This subroutine is described in greater detail below in connection with FIG. 13. Upon return from the DIST2PT subroutine, block 216 executes the CHKRGT subroutine 466 which determines whether the distance between the current point and the starting point of the arc corresponds to an arc of 80° such that the vehicle has changed its direction of travel a predetermined amount. This subroutine is described in greater detail below in connection with FIG. 14. Upon return from the CHKRGT subroutine 466, block 218 determines whether the GOTDIST flag is set indicating that the distance does correspond to an arc of 80°. If the flag is set, the program proceeds to block 222 of FIG. 4E. If block 218 determines that the GOTDIST flag is not set, then the program proceeds to block 220. Alternatively, the program may branch to block 220 from block 226 of FIG. 4E, as described below. Block 220 stores variables E1HI and E2HI in variables E1LOW and E2LOW, respectively, and sets variable BSTAT equal to eight. The program then proceeds to block 236 of FIG. 4E.

Figure 4E:
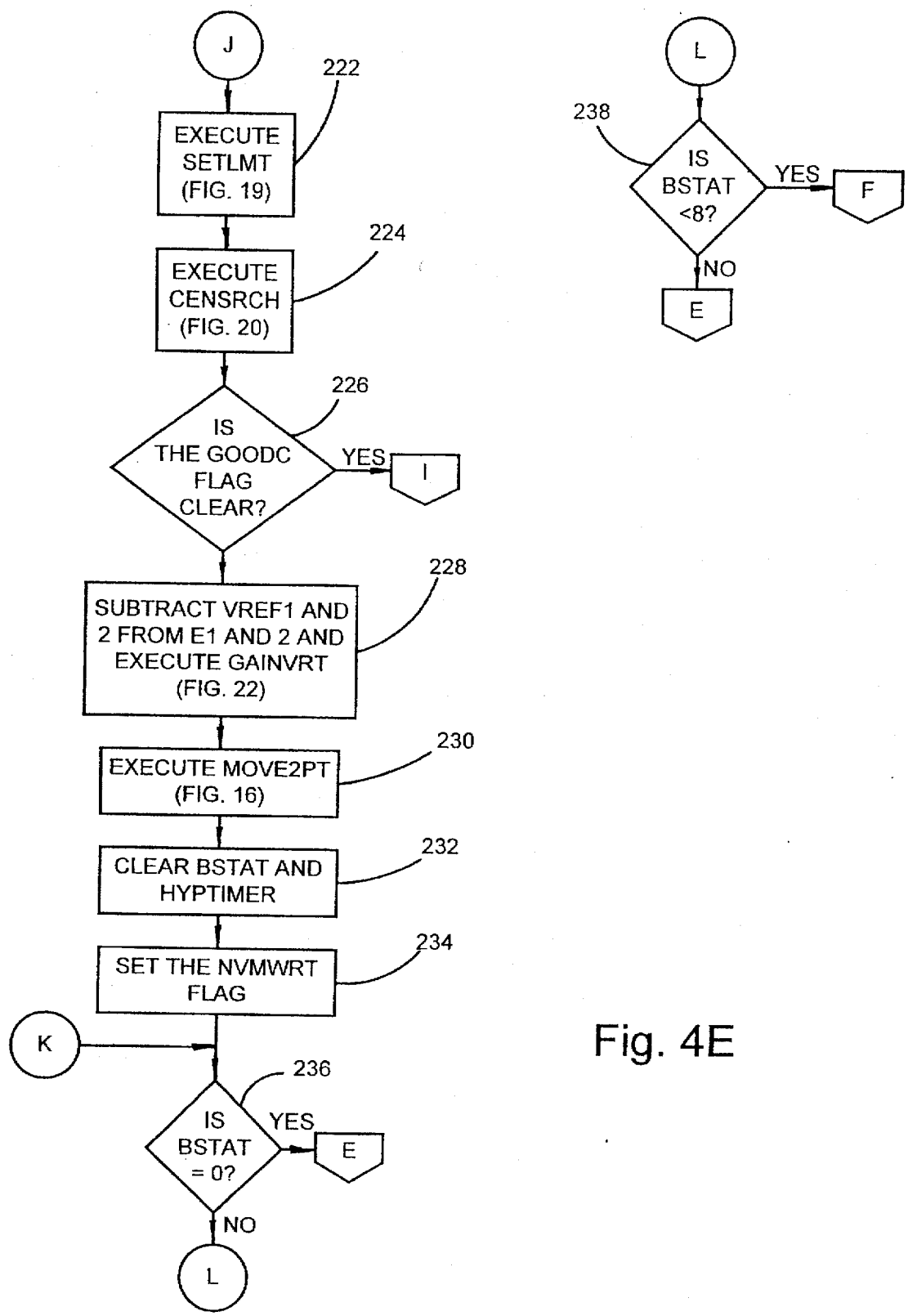

Referring to FIG. 4E, block 222 is entered if block 218 of FIG. 4D determined that the GOTDIST flag was set indicating an arc of at least 80° had been generated between the starting point and the current point of sensor data such that the vehicle changed its direction of travel a predetermined amount. The program is now at the stage where it determines the center of the arc. Block 222 executes the SETLMT subroutine 570 which establishes the upper and lower horizontal and vertical limits in which to search for the center of the arc in the X-Y coordinate plane. This subroutine is described in greater detail below in connection with FIG. 19. Upon return from the SETLMT subroutine 570, block 224 executes the CENSRCH subroutine 590 which searches for the center of the arc within the established limits. This subroutine is described in greater detail below in connection with FIGS. 20A and 20B.

Upon return from the CENSRCH subroutine 590, block 226 determines if the GOODC flag, indicating whether a good center point has been established, is clear. If it is, then the program proceeds to block 220 of FIG. 4D. If block 226 determines that the GOODC flag is set, indicating that a good center has been established, then the program proceeds to block 228. Block 228 subtracts variables VREF1 and VREF2 from buffers E1 and E2, respectively, and executes the GAINVRT subroutine 650. This subroutine, described in detail below in connection with FIG. 22, enables the program to easily manipulate the compass data by reversing the effect of the MAKEQU subroutine 300 of FIG. 6 which is used to make the elliptical data circular.

Upon return from the GAINVRT subroutine 650, block 230 executes the MOVE2PT subroutine 496 to shift the origin of the X-Y coordinate plane such that it coincides with the center of the arc. The MOVE2PT subroutine is described in greater detail below in connection with FIGS. 16A and 16B. Upon return therefrom, block 232 clears variable BSTAT to indicate that the program is finished recovering from an abrupt and significant change in vehicle magnetics, and clears variable HYPTIMER which kept track of the distance travelled by the vehicle while the plot of sensor data was outside the predetermined threshold to ensure that the change in vehicle magnetics was not temporary. Next, block 234 sets the NVMWRT flag which indicates that a write to nonvolatile memory is required to store the new calibration numbers. This is necessary in case a power cycle occurs (i.e., ignition turned off) to ensure that the current calibration numbers are retained and can be retrieved when the vehicle is started again. After block 234, the program proceeds to block 236. Alternatively, the program may branch to block 236 from block 186 of FIG. 4C or block 204, 212, or 220 of FIG. 4D, as described above. Block 236 determines if variable BSTAT is equal to zero. This question is asked even though variable BSTAT was cleared in block 232 because the program may branch to this point from elsewhere in the programming. If block 236 determines that variable BSTAT is equal to zero, then the program proceeds to block 188 of FIG. 4D to update the vehicle heading. If variable BSTAT is not equal to zero, then the program proceeds to block 238 which determines if variable BSTAT is less than eight. If it is, then the program proceeds to block 192 of FIG. 4D. If block 238 determines that variable BSTAT is not less than eight, then the program proceeds to block 188 of FIG. 4D.

The DATCHK subroutine 240 is shown in FIGS. 5A and 5B. This subroutine is executed in blocks 102 and 108 of the main program routine of FIG. 4A to analyze the collected compass channel data and to set certain flags corresponding thereto. The subroutine begins with block 242 which determines if the FSTPAS flag is clear. If it is, then the subroutine is exited via block 244. If block 242 determines that the FSTPAS flag is not clear, then block 246 determines if the vehicle is not moving. If the vehicle is not moving, then the subroutine is exited via block 248 because continued analysis of the compass data is undesirable due to possible magnetic interference caused by stationary objects. If block 246 determines that the vehicle is moving, then block 250 determines if variable BSTAT is equal to one or if the GOTCIR flag is clear. If either of these conditions is true, then the program proceeds to block 258. If block 250 determines that neither condition is true, then block 252 determines if the compass channel currently under analysis is saturated such that the data exceeds or is close to exceeding the measurement range of the current X-Y coordinate system. If it is, block 254 sets that channel's saturation flag and the program proceeds to block 258. If block 252 determines that the compass channel is not saturated, then block 256 clears that channel's saturation flag. Next, block 258 subtracts variable VREF1 or VREF2, depending on which compass channel is currently under analysis, from the current compass channel data and stores the result in byte number 4 of the six-byte buffer E1 or E2. Subtraction of the appropriate VREF variable from the channel data changes the channel data to two's compliment numbers to simplify certain calculations performed in subsequent blocks. The program then proceeds to block 260 which executes the MAKEQU subroutine 300 on the byte number 4 data to eliminate any elliptical effects in the plot of sensor data caused by the construction parameters of the vehicle. This subroutine is described in greater detail below in connection with FIG. 6. Upon return from the MAKEQU subroutine 300, block 260 stores the corrected compass data in byte number 5 of the appropriate six-byte buffer E1 or E2. Next, block 262 executes the TWIT subroutine 338 to determine if the channel data has undergone a significant change which is greater than the expected change in compass heading caused by turning the vehicle. This subroutine is described in greater detail below in connection with FIG. 7.

Upon return from the TWIT subroutine 338, the program proceeds to block 264 which determines if variable BSTAT is greater than zero indicating that an abrupt and significant change in vehicle magnetism has been detected. If it is, then the program proceeds to block 280 of FIG. 5B. If block 264 determines that variable BSTAT is not greater than zero, then block 266 determines if the North/South channel data is currently under analysis. If it is, then the subroutine is exited via block 268. If block 266 determines that the North/South channel data has already been analyzed, indicating that the channel 2 (East/West channel) data is currently under analysis, then block 270 calculates the squared radius of the plot of current compass data of both channels. Squared values are used because they simplify the calculations in the microprocessor. Next, block 272 executes the SQUAROOT subroutine 368 to calculate the square root of the squared radius calculated in block 270. This subroutine is described in greater detail in connection with FIG. 8. Upon return from the SQUAROOT subroutine 368, block 272 compares the current radius to variable HYPOT and calculates the absolute difference between the two values to determine if an abrupt and significant change in vehicle magnetism has occurred. Stored within variable HYPOT is the radius of the calibrated circle which corresponds to the earth's magnetic field strength. Next, block 274 determines if the difference calculated in block 272 is greater than 20 counts which is the predetermined threshold establishing whether a substantial change in vehicle magnetism has occurred. In the preferred embodiment, this threshold of 20 counts represents 100 milligauss of magnetism. If it is, then the program proceeds to block 276 of FIG. 5B. If block 274 determines that the difference is less than 20, then the program proceeds to block 278 of FIG. 5B.

As mentioned above, the program enters block 276 of FIG. 5B if block 274 of FIG. 5A determined that the difference between the current radius and the radius of the calibrated circle was greater than 20. Block 276 sets the BADHYP flag to indicate that the current data is outside the predetermined threshold indicating an abrupt and significant change in vehicle magnetics. The program enters block 278 if block 274 of FIG. 5A determined that the difference was less than 20. Block 278 clears the BADHYP flag to indicate that the current data is within the above-mentioned predetermined threshold. Next, block 280 determines if the twit flags (TWIT1 and TWIT2) are clear. If not, the program proceeds to block 288. If block 280 determines that the twit flags are clear, then block 282 adds variable SPEED, indicating the current speed of the vehicle, to the two byte variable HYPTIMER which is a counter that indicates the distance travelled by the vehicle while the compass data is outside the above-mentioned threshold. Next, block 284 determines if variable HYPTIMER is greater than 1800 hexadecimal which would indicate that the vehicle has travelled a predetermined distance, for example ¼ or ⅛ mile, such that the program can safely assume that the shift in vehicle magnetics is not temporary. If variable HYPTIMER is not greater than 1800 hexadecimal, the program proceeds to block 288. If it is greater than 1800 hexadecimal, then block 286 executes the QUICKCAL subroutine 386 which performs the set-up procedures for recovering from the shift in vehicle magnetics. This subroutine is described in greater detail below in connection with FIG. 9.

Upon return from the QUICKCAL subroutine 386, the program proceeds to block 288 which determines if all of the flags handled in this subroutine (DASTAT flags) are clear. If they are, then block 290 decrements variable BADDAT which is a counter that is zero when sixteen consecutive "good" compass readings have been received. Next, block 292 determines if counter variable BADDAT is equal to zero. If it is, then block 294 sets the WOWTWO flag to indicate that sixteen consecutive "good" compass readings have been received. After block 294, or if block 292 determines that counter variable BADDAT is not equal to zero, then the program proceeds to block 298 and the subroutine is exited. Returning to block 288, if it determines that not all of the flags handled in this subroutine are clear, then block 296 loads 10 hexadecimal into counter variable BADDAT, and the subroutine is exited via block 298.

Figure 6:
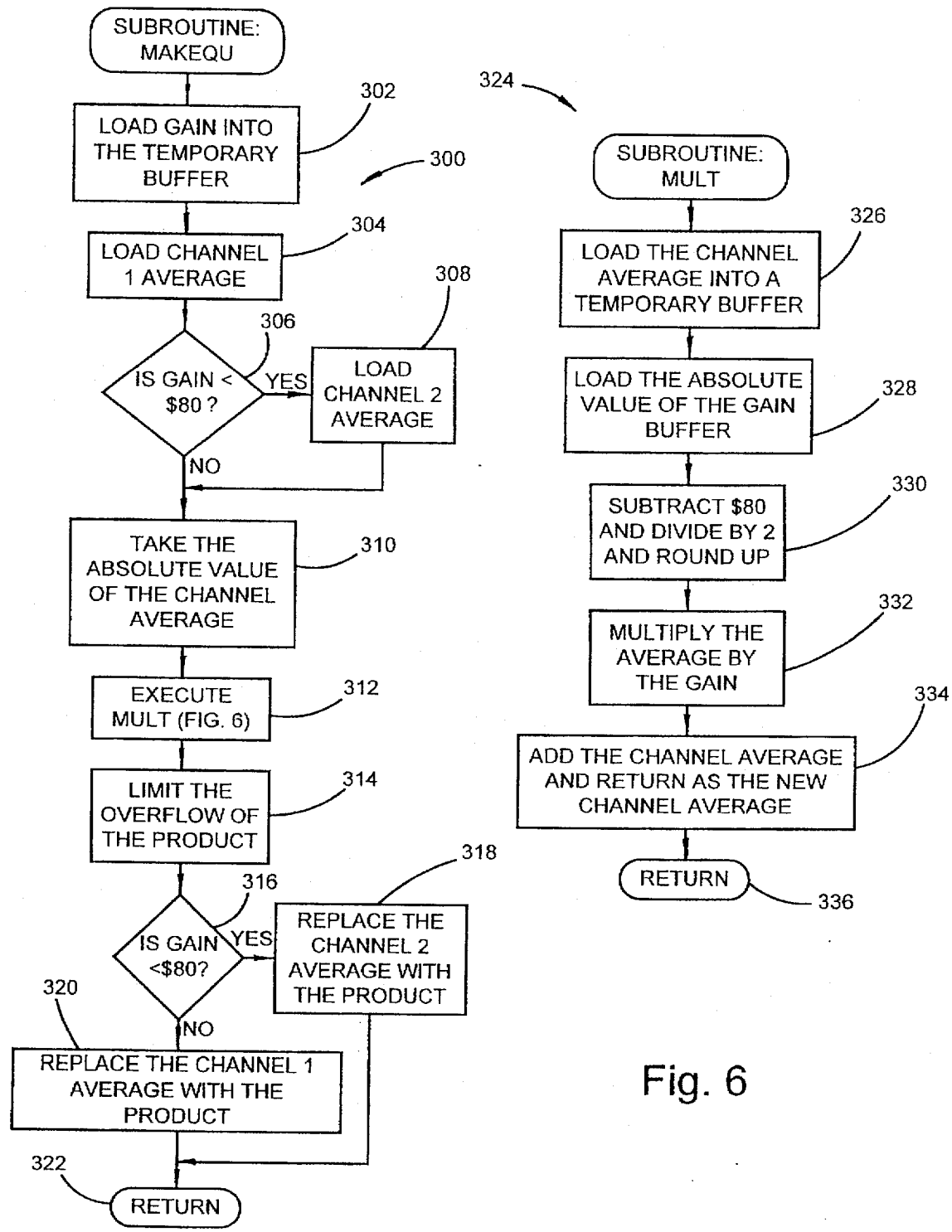

Referring to FIG. 6, shown is the MAKEQU subroutine 300. This subroutine is executed in blocks 178 and 260 of the main programs routine 100 and the DATCHK subroutine 240, respectively, to eliminate any elliptical effect in the plot of sensor data caused by the construction parameters of the vehicle. The subroutine begins with block 302 which loads the GAIN value into the temporary gain buffer. The GAIN value is computed in the compensation system of U.S. Pat. No. 4,953,305, and is the ratio of one channel span to the other channel span. Next, block 304 loads the channel 1 (North/South channel) average into the accumulator, or arithmetic register, of microprocessor 50 for processing. Block 306 then determines if the GAIN value is less than 80 hexadecimal. If it is, then block 308 loads the channel 2 (East/West) average into the accumulator of microprocessor 50 for processing. After block 308, or if block 306 determines that the GAIN value is not less than 80 hexadecimal, the program proceeds to block 310 which takes the absolute value of the channel average loaded into the accumulator to ensure that positive numbers are being manipulated. Next, block 312 executes the MULT subroutine 324 which is described in detail below in connection with FIG. 6. Upon return from the MULT subroutine, block 314 limits the overflow of the product by rounding the 16 bit result into an 8 bit number. Next, block 316 determines if the GAIN value is less than 80 hexadecimal. If it is, then block 318 replaces the channel 2 (East/West) average with the product calculated in blocks 312 and 314. The subroutine is then exited via block 322. If block 316 determines that the GAIN value is not less than 80 hexadecimal, then block 320 replaces the channel 1 (North/South) average with the product calculated in blocks 312 and 314. The subroutine is then exited via block 322.

The MULT subroutine 324 is shown in FIG. 6. This subroutine is executed in block 312 of the MAKEQU subroutine 300 and blocks 656 and 666 of the GAINVRT subroutine 650. The subroutine begins with block 326 which loads the channel average currently being processed into a temporary buffer. Next, block 328 loads the absolute value of the gain buffer into the accumulator of microprocessor 50 for processing. Block 330 then subtracts 80 hexadecimal from the accumulator, divides by two, and rounds the result up. The program then proceeds to block 332 which multiplies the channel average in the accumulator by the gain. Next, block 334 adds the channel average in the temporary buffer to the accumulator and returns the result as the new channel average. The subroutine is then exited via block 336.

Figure 7:
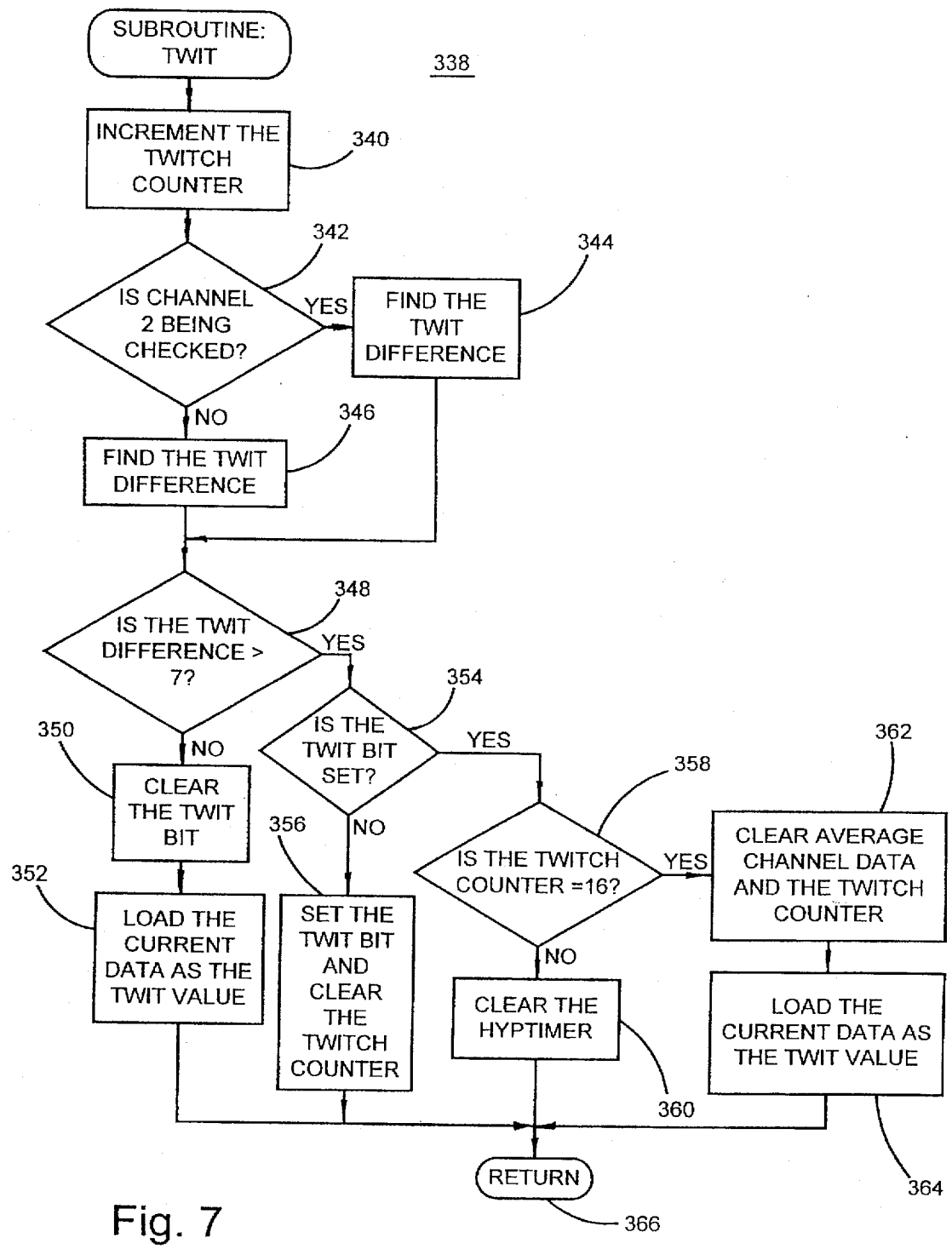

FIG. 7 shows the TWIT subroutine 338. This subroutine is executed in block 262 of FIG. 5A of the DATCHK subroutine 240 to determine if the data of a compass channel has undergone a significant change which is greater than the expected change in compass heading caused by turning the vehicle. The subroutine begins with block 340 which increments the twitch counter. Next, block 342 determines if the compass channel currently being checked is channel 2 (East/West channel). If it is, then block 344 finds the twit difference which is the difference between the current channel data and the last "good" channel data (stored as the twit value), and the program proceeds to block 348. If block 342 determines that the North/South channel is currently being checked, then block 346 finds the twit difference. Next, block 348 determines if the twit difference is greater than seven. If not, then block 350 clears the twit flag TWIT1 or TWIT2, depending on which channel is currently being processed, and block 352 loads the current channel data as the twit value. The subroutine is then exited via block 366. If block 348 determines that the twit difference is greater than seven, then block 354 determines if the twit flag (TWIT1 or TWIT2) is set. If not, then block 356 sets the twit flag and clears the twitch counter, and block 366 exits the subroutine. If block 354 determines that the twit flag is set, then block 358 determines if the twitch counter is equal to 16. Here, the twitch counter is equal to 16 only when the twit difference of the channel data has been greater than seven for an extended period of time such that the last "good" channel data stored as the twit value can no longer be relied upon. If block 358 determines that the twitch counter is not equal to 16, then block 360 clears counter variable HYPTIMER, and the subroutine is exited via block 366. If block 358 determines that the twitch counter is equal to 16, then block 362 clears the average channel data stored in buffer E1 or E2 depending on which channel is being processed, and the twitch counter is cleared. Next, block 364 loads the current channel data as the twit value, and the subroutine is exited via block 366.

Figure 8:
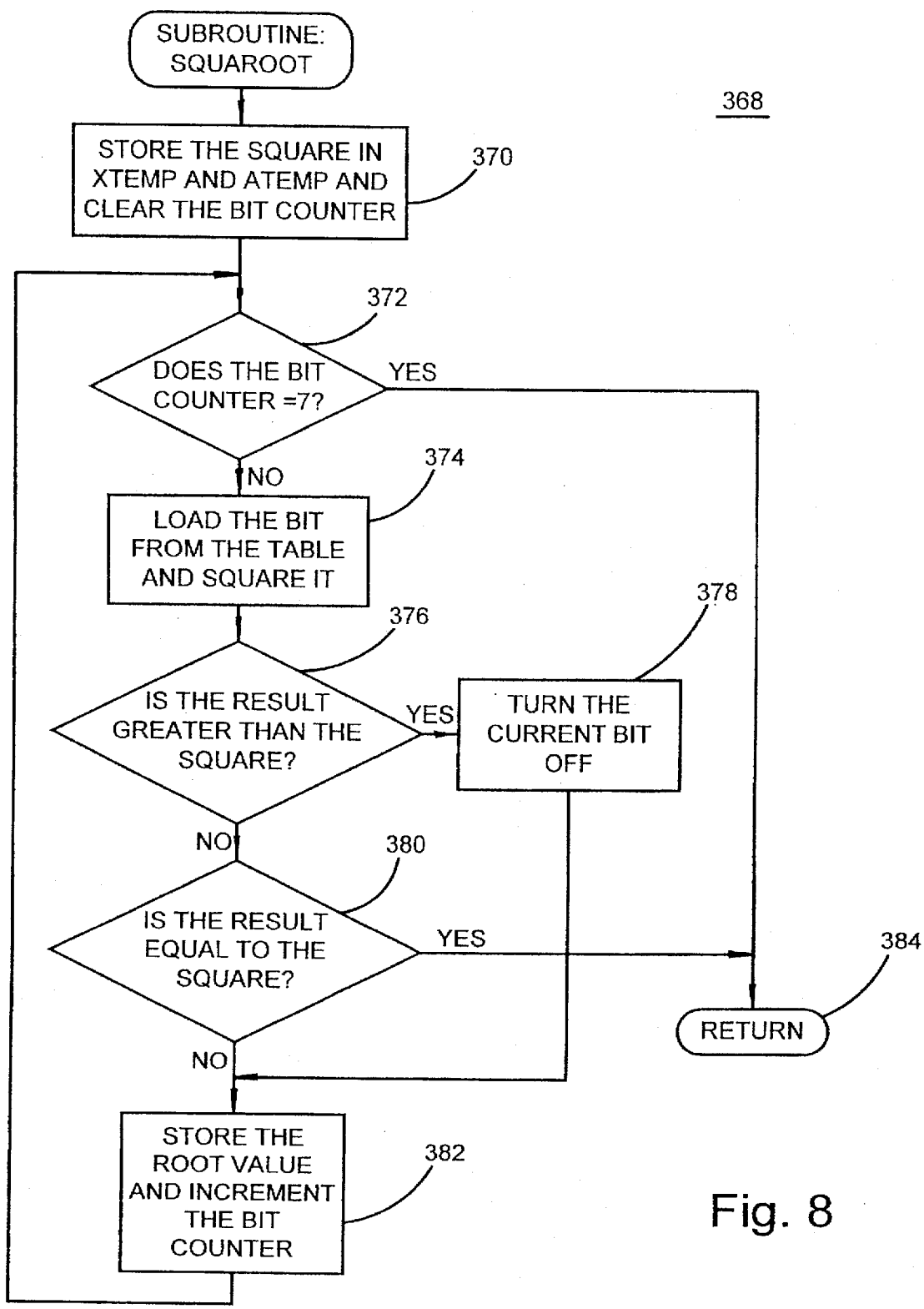

Referring to FIG. 8, shown is the SQUAROOT subroutine 368. This subroutine is executed in block 272 of FIG. 5A of the DATCHK subroutine 240 to calculate the square root of the squared radius calculated in block 270. The subroutine begins with block 370 which stores the squared radius in temporary storage variables XTEMP and ATEMP, and clears the bit counter which indicates the number of times the internal loop within the subroutine has been executed. Next, block 372 determines if the bit counter is equal to 7, and, if it is, the subroutine is exited via block 384. If the bit counter is not equal to 7, then block 374 analyzes a lookup table to determine the place value of the current bit being processed, as determined by the bit counter, and squares the result. Next, block 376 determines if the result of block 374 is greater than the squared radius. If it is, then block 378 makes the current bit zero, and the program proceeds to block 382. If block 376 determines that the result of block 374 is not greater than the squared radius, then block 380 determines if the result is equal to the squared radius. If it is, then the subroutine is exited via block 384. If block 380 determines that the result of block 374 is not equal to the squared radius, then the program proceeds to block 382. Block 382 stores the root value calculated up to that point and increments the bit counter, and the program loops back to block 372.

Figure 9:
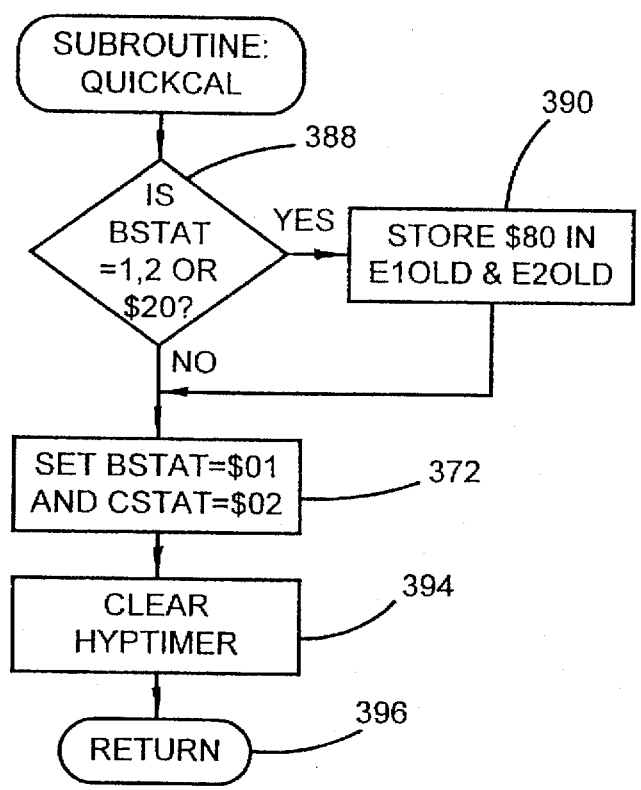

FIG. 9 shows the QUICKCAL subroutine 386. This subroutine is executed in block 286 of the DATCHK subroutine 240 to perform the set-up procedures for recovering from an abrupt and significant shift in vehicle magnetics. The subroutine begins with block 388 which determines if variable BSTAT is equal to 1, 2, or 20 hexadecimal. If it is, then block 390 stores the value of 80 hexadecimal into variables E1OLD and E2OLD. This results since the execution of this subroutine when BSTAT is equal to 1, 2, or 20 hexadecimal indicates that the former values in variables E1OLD and E2OLD no longer represent the last good heading before a shift in vehicle magnetics. As such, there no longer is an accurate estimate as to the current heading of the vehicle, and setting variables E1OLD and E2OLD equal to 80 hexadecimal provides an estimate which is furthest from the saturation limits of the X-Y coordinate plane. After block 390, or if block 388 determines that variable BSTAT is not equal to 1, 2, or 20 hexadecimal, the program proceeds to block 392. Block 392 sets variable BSTAT equal to 1 and sets variable CSTAT equal to 2. Next, block 394 clears counter variable HYPTIMER, and the subroutine is exited via block 396.

Figure 10:
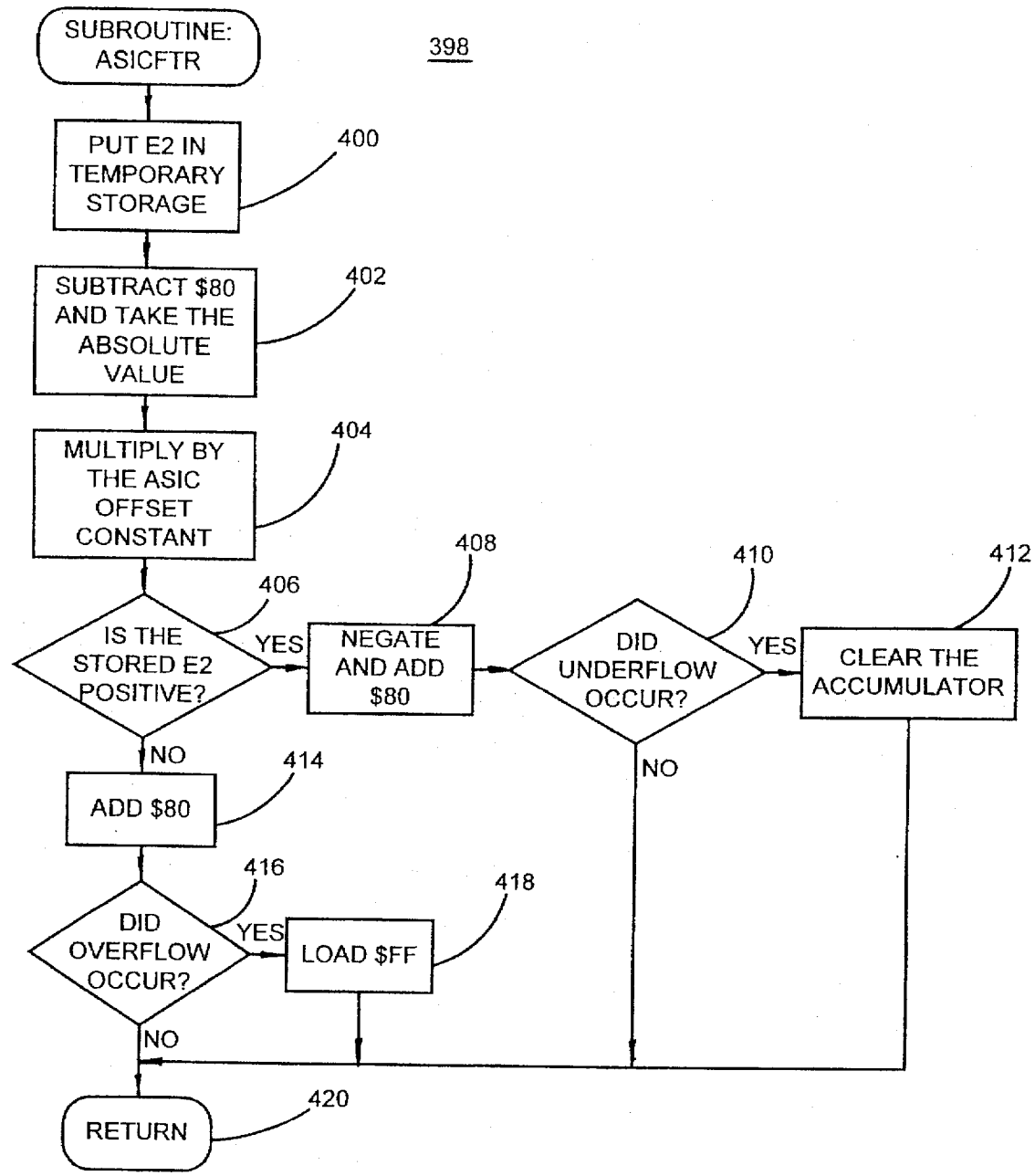

Referring now to FIG. 10, shown is the ASICFTR subroutine 398. This subroutine is executed in block 106 of the main program of FIG. 4A to eliminate any elliptical effect in the plot of sensor data, caused by the construction of the flux-gate, by equalizing the gain of the two compass channels. The subroutine begins with block 400 which loads buffer E2, storing the East/West channel data, into both temporary storage and the accumulator of microprocessor 50. Next, block 402 subtracts 80 hexadecimal from the accumulator and takes the the absolute value of the difference. The program then proceeds to block 404 which multiplies this absolute value in the accumulator by the offset constant of magnetometer 48. The offset constant is the ratio of one channel span to the other channel span caused by the construction of the flux-gate sensor 46. Next, block 406 determines if the current channel data of buffer E2, stored in temporary storage, is positive. If it is, then block 408 negates the value in the accumulator and adds 80 hexadecimal. Next, block 410 determines if underflow occurred in the accumulator (more negative than −128 in two's complement numbers) and, if it did, then block 412 clears the accumulator. After block 412, or if block 410 determines that underflow did not occur, the program proceeds to block 420 and the subroutine is exited. Returning to block 406, if it determines that the current channel data of buffer E2, stored in temporary storage, is not positive, then block 414 adds 80 hexadecimal to the value in the accumulator. Next, block 416 determines if overflow occurred in the accumulator (more positive than 128 in two's compliment numbers) and, if it did, block 418 loads hexadecimal FF into the accumulator. After block 418, or if block 416 determines that overflow did not occur, the subroutine is exited via block 420.

Figure 11:
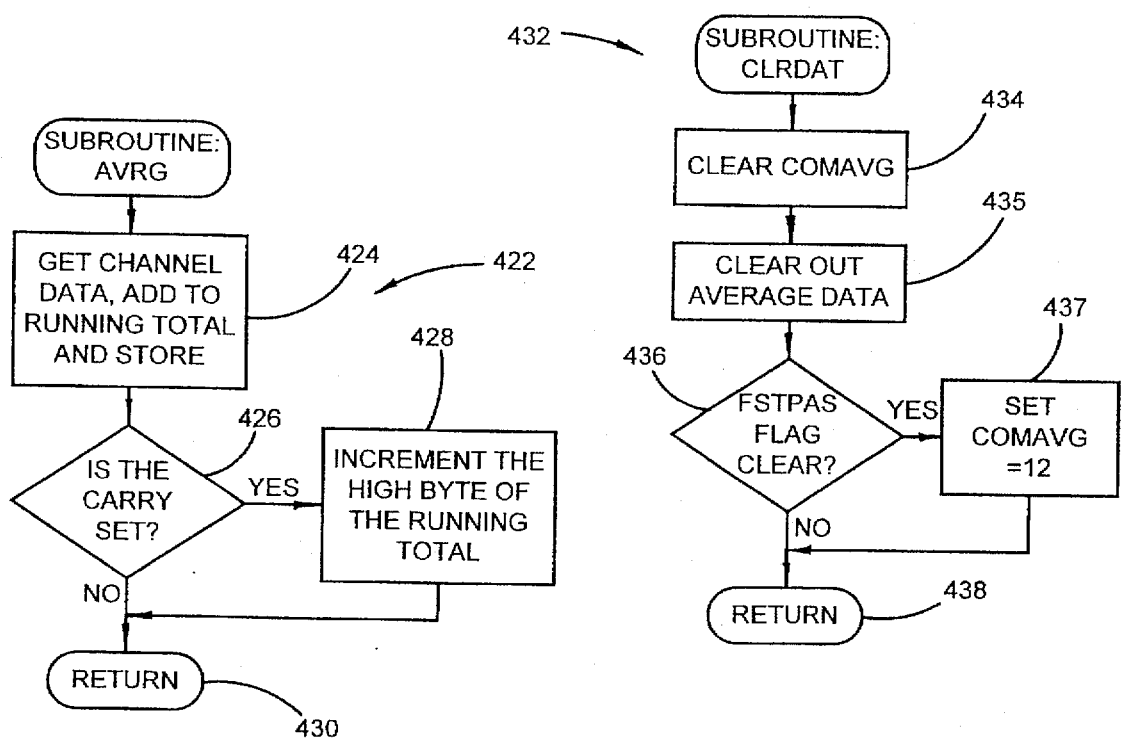

The AVRG subroutine 422 is shown in FIG. 11. This subroutine is executed in blocks 118 and 120 of the main program routine of FIG. 4A to add the current channel data to a running total which enables a two-second average to subsequently be calculated. The subroutine begins with block 424 which adds the 8-bit channel data currently being processed to a 16-bit running total which is stored in that channel's buffer (E1 or E2). Next, block 426 determines if the addition performed in block 424 caused a carry to be set. If the carry is set, then block 428 increments the high byte of the channel data buffer which is storing the running total. After block 428, or if block 426 determines that the carry is not set, the subroutine is exited via block 430.

FIG. 11 shows the CLRDAT subroutine 432. This subroutine is executed in block 126 of the main program routine of FIG. 4A and enables the system to stabilize itself after power-up. The subroutine begins with block 434 which clears counter variable COMAVG. Next, block 435 clears the averaged compass channel data in buffers E1 and E2. Block 436 then determines if the FSTPAS flag is clear and, if it is, block 437 sets variable COMAVG equal to 12. After block 437, or if block 436 determines that the FSTPAS flag is not clear, then the program proceeds to block 438 and the subroutine is exited.

Figure 12:
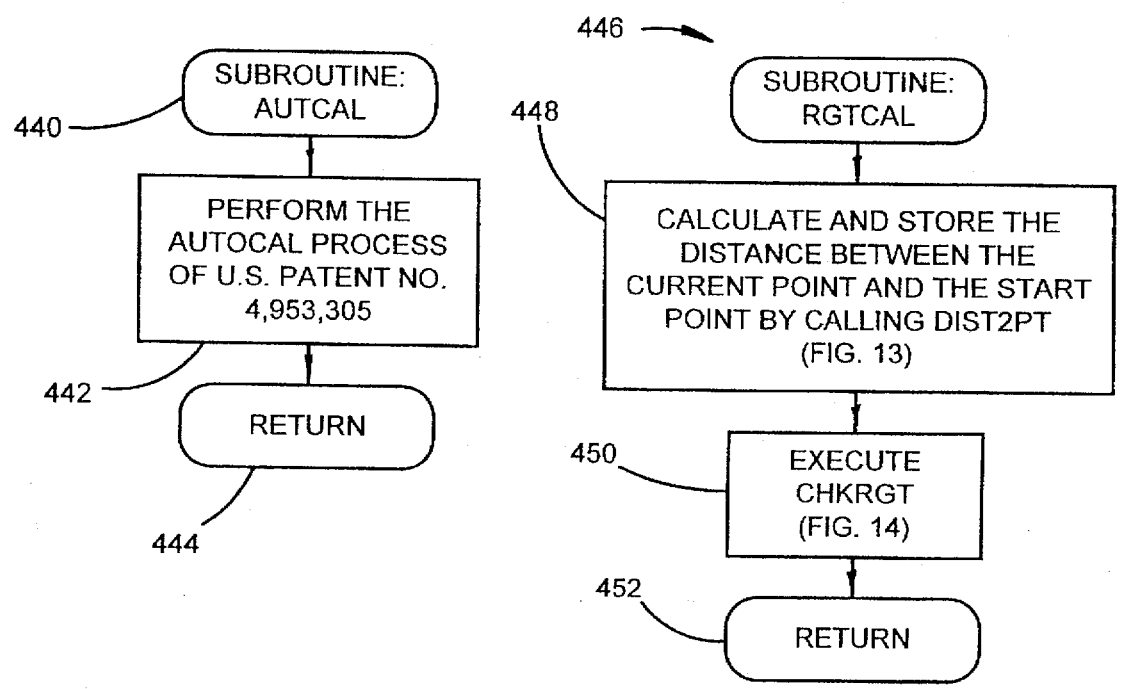

Referring to FIG. 12, shown is the AUTCAL subroutine 440 which is executed in block 140 of the main compass routine of FIG. 4B. This subroutine begins with block 442 which performs the compensation system disclosed in U.S. Pat. No. 4,953,305, incorporated herein by reference. The subroutine is then exited via block 444.

The RGTCAL subroutine 446 is shown in FIG. 12. This subroutine is executed in block 144 of the main compass routine of FIG. 4B to determine the angle spanned by the arc of plotted compass data. The subroutine begins with block 448 which executes the DIST2PT subroutine 454 to calculate and store the distance between the current compass data point and the starting point of the arc stored in variables E1LOW and E2LOW. The DIST2PT subroutine is described in detail in connection with FIG. 13. Upon return from the DIST2PT subroutine 454, the program proceeds to block 450 which executes the CHKRGT subroutine 466 to determine the angle of the arc between the current compass data point and the starting point of the arc. The CHKRGT subroutine is described in greater detail in connection with FIG. 14. Upon return from the CHKRGT subroutine 466, the RGTCAL subroutine exits via block 452.

Figure 13:
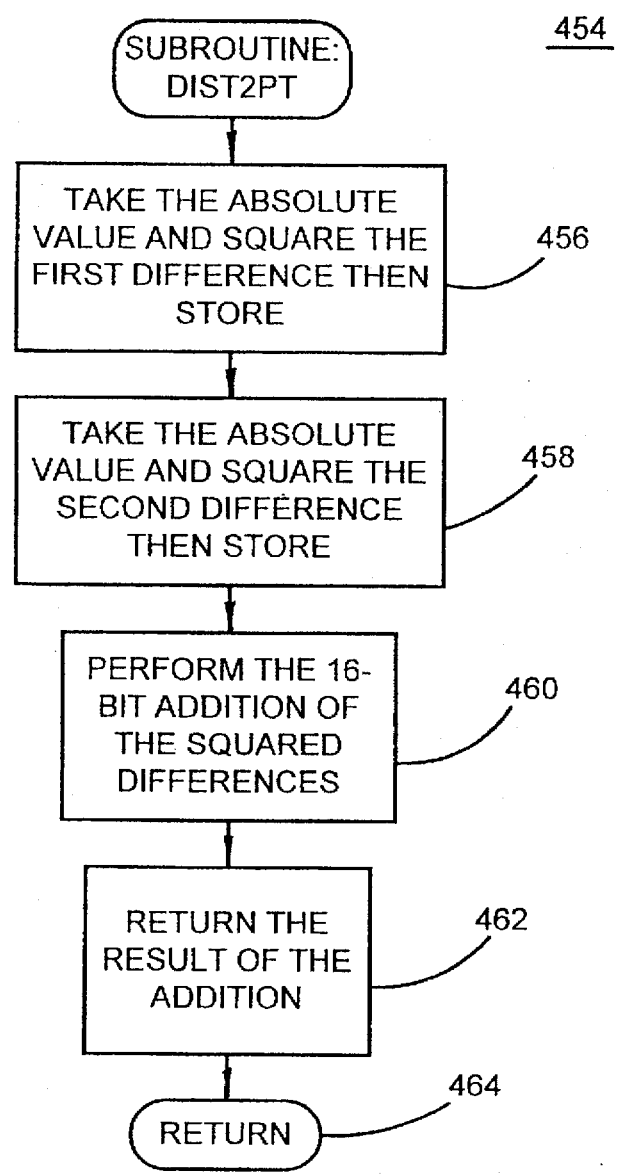

Referring to FIG. 13, shown is the DIST2PT subroutine 454. This subroutine is executed in several programming blocks to determine the distance between two points on the X-Y coordinate system. The subroutine begins with block 456 which takes the absolute value of the difference of one channel of the compass data of the two points, squares it, and stores the result. Block 458 then performs the same calculations on the other channel of compass data of the two points. Next, block 460 performs 16-bit addition of the squared differences obtained above. Block 462 then stores the result of the addition which is equal to the squared distance between the two points of interest. The subroutine is then exited via block 464.

Figure 14:
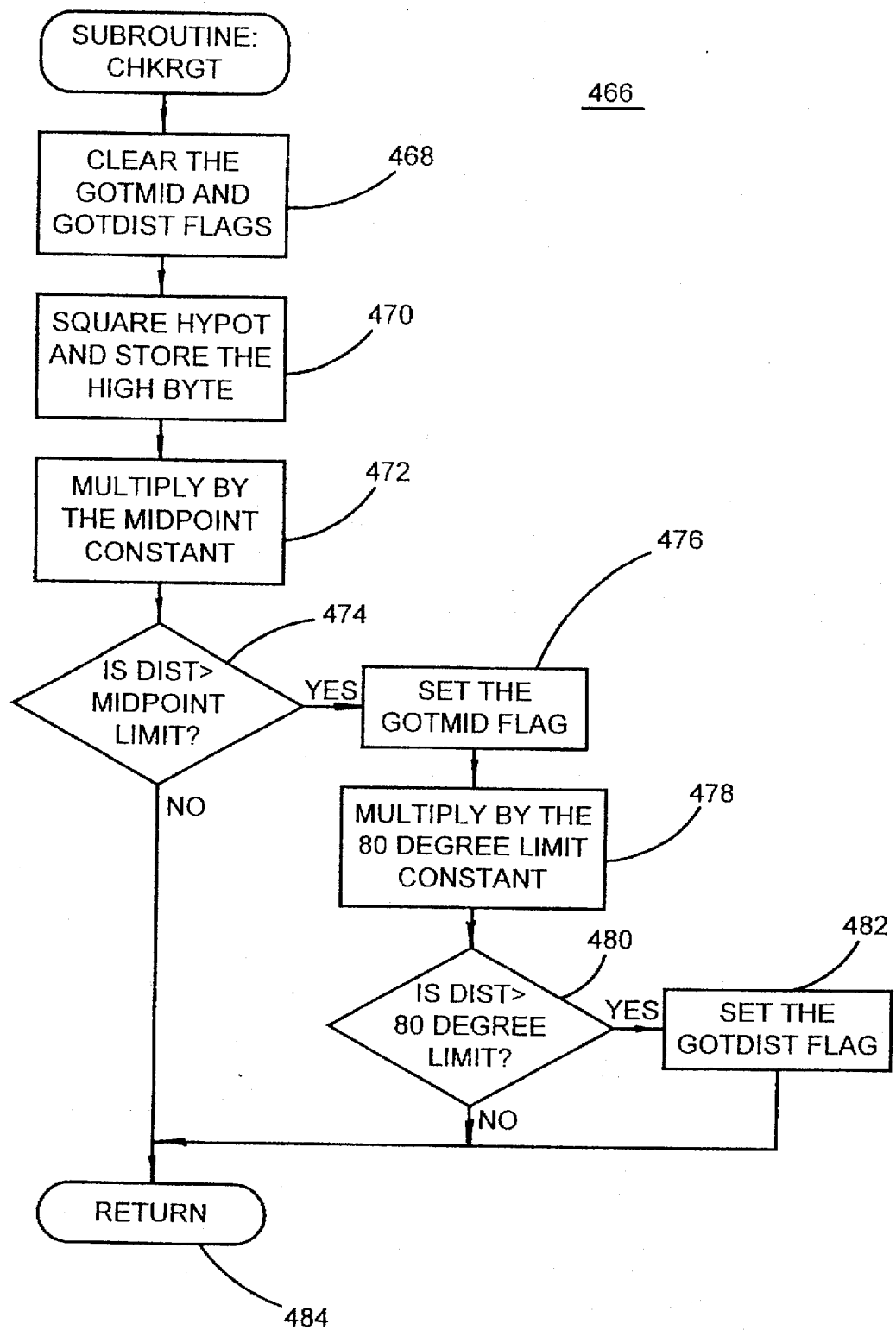

FIG. 14 shows the CHKRGT subroutine 466. This subroutine is executed in blocks 216 and 450 of the main program routine 100 and the RGTCAL subroutine 446, respectively, to determine the angle of the arc between the current compass data point and the starting point of the arc stored in variables E1LOW and E2LOW. This angle corresponds to the amount which the vehicle has changed its direction of travel. The subroutine begins with block 468 which clears the GOTMID and GOTDIST flags. When set, the GOTMID and GOTDIST flags indicate that the vehicle has changed its direction of travel a predetermined amount which, in the preferred embodiment, corresponds to an arc span in excess of the predetermined angles of 45° and 80°, respectively. Next, block 470 squares the variable HYPOT, which stores the radius of a calibrated circle, and stores the high byte of the result. The program then proceeds to block 472 which multiplies the result obtained in block 470 by the midpoint constant which calculates the distance required between two points on the circle in order for the arc they create to span 45°. Next, block 474 determines if the distance between the current compass data point and the starting point of the arc is greater than the distance calculated in block 472. If not, the subroutine is exited via block 484. If block 474 determines that the distance is greater, then block 476 sets the GOTMID flag to indicate that the arc span has exceeded 45° which corresponds to a predetermined amount of change in the direction of vehicle travel. Next, block 478 multiplies the result obtained in block 470 by the 80° limit constant which calculates the distance required between two points on the circle in order for the arc they create to span 80°. Block 480 then determines if the distance between the current compass data point and the starting point of the arc is greater than the distance calculated in block 478. If it is, then block 482 sets the GOTDIST flag to indicate that the arc span has exceeded 80° which corresponds to a predetermined amount of change in the direction of vehicle travel. After block 482, or if the determination in block 480 yields a negative result, the program proceeds to block 484 which exits the subroutine.

Figure 15:
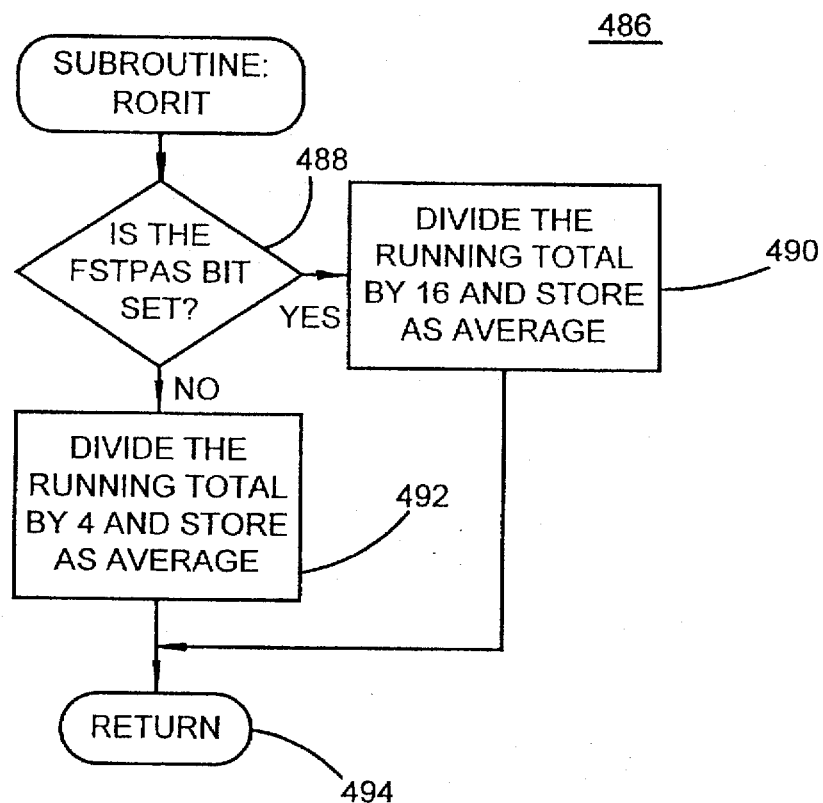

Referring to FIG. 15, the RORIT subroutine 486 is shown. This subroutine is executed in blocks 152 and 162 of the main program routine of FIG. 4C and calculates the average of the running total stored in the compass channel buffers. The subroutine begins with block 488 which determines if the FSTPAS flag is set indicating that the first average of channel data has already been collected. If it is, then block 490 divides the running total stored in the particular compass channel buffer by 16 and stores the result which is the average. The program then proceeds to block 494 which exits the subroutine. If block 488 determines that the FSTPAS flag is clear, then block 492 divides the running total stored in the particular compass channel by 4 and stores the result which is the average. The subroutine then exits via block 494.

Figure 16A:
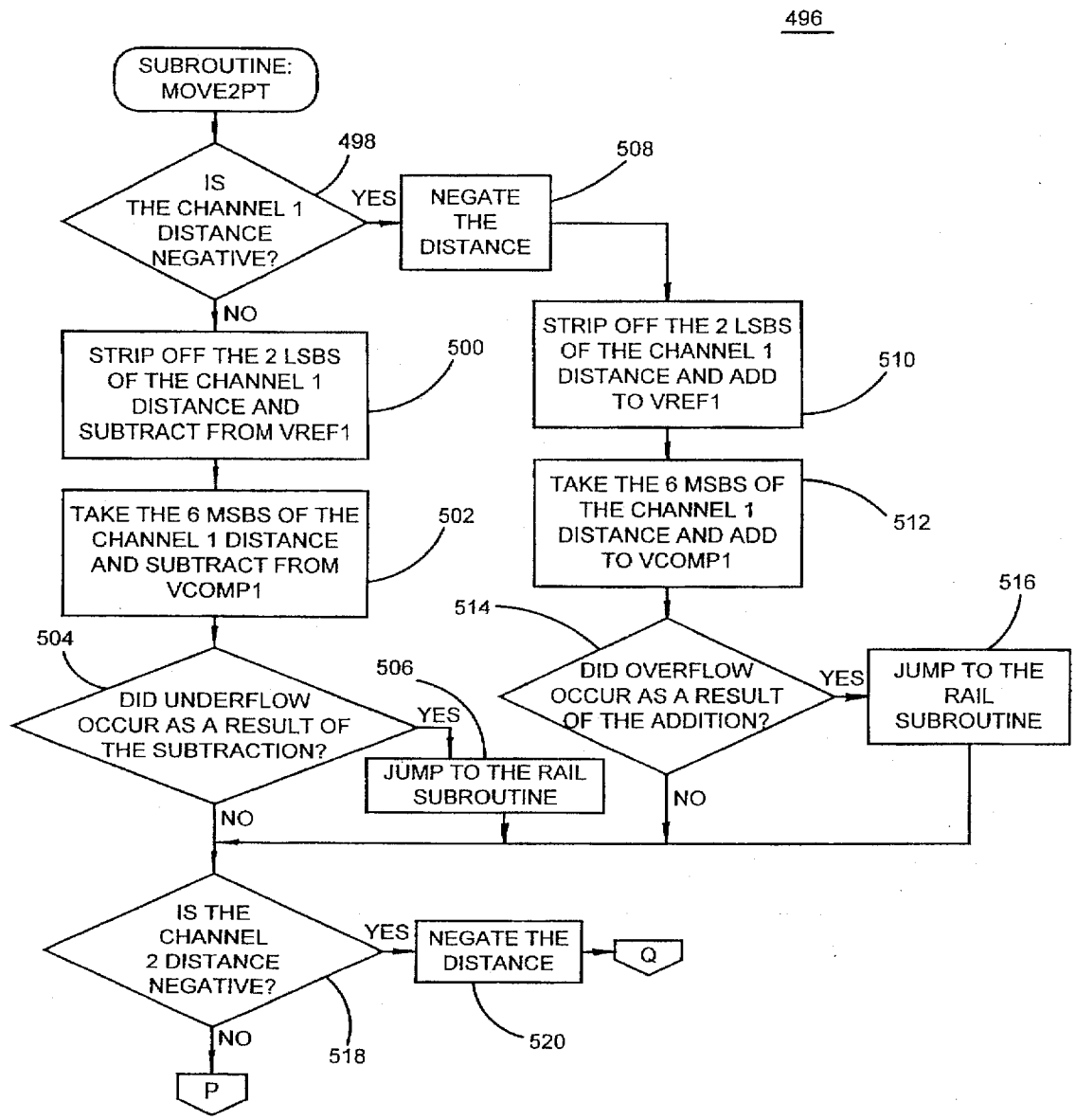
Figure 16B:
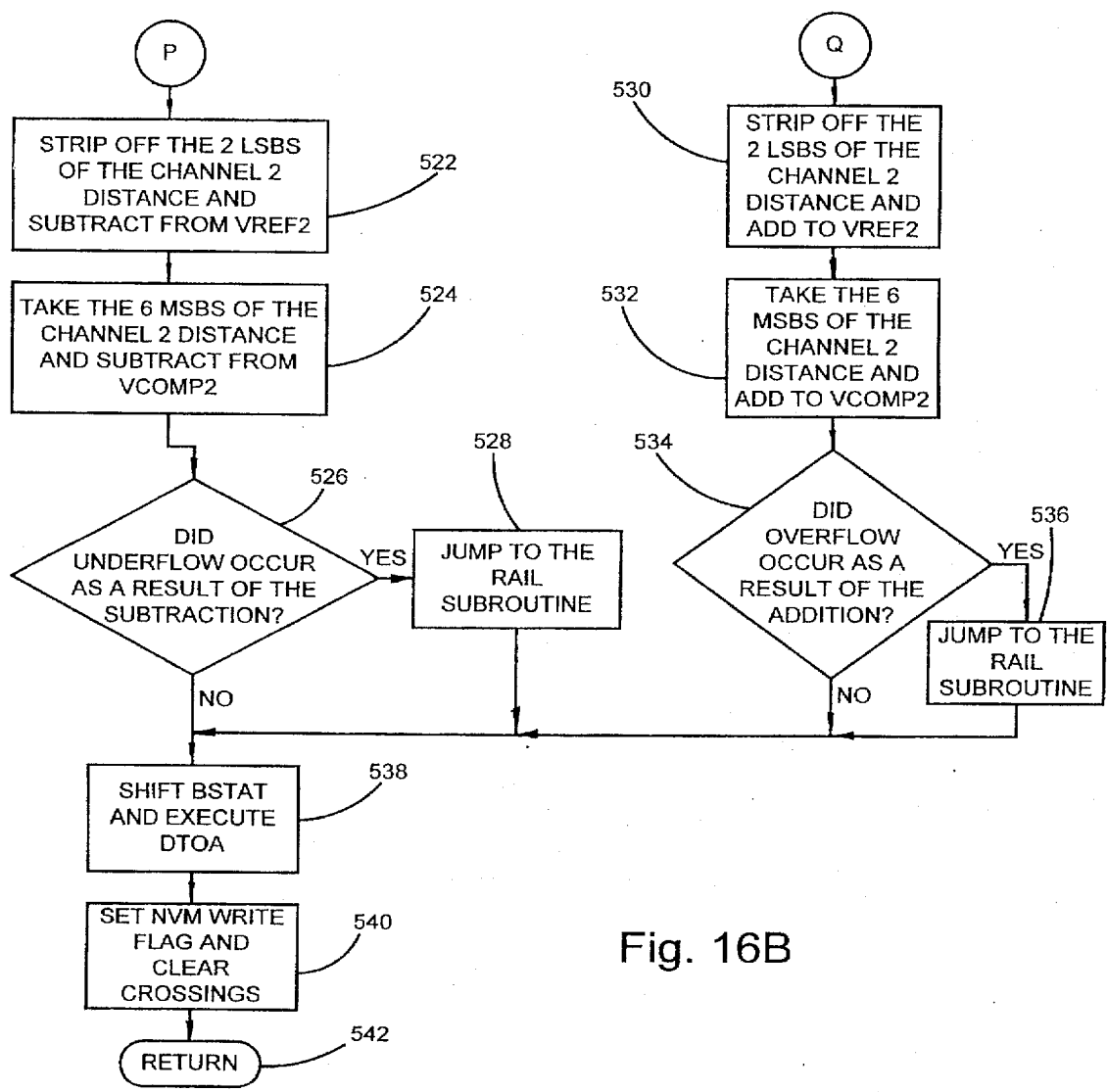

The MOVE2PT subroutine 496 is shown in FIGS. 16A and 16B. This subroutine is executed in blocks 172 and 230 of the main program routine 100 to shift the X-Y coordinate plane such that one point on the plane is moved to the position of another point. The subroutine begins with block 498 of FIG. 16A which determines if the channel 1 (North/South channel) data is negative. This data indicates both the direction and distance which the X-Y coordinate plane must be shifted on the X axis. If it is negative, then block 508 negates the distance to make it positive. Next, block 510 strips off the two least significant bits of the channel 1 distance and adds them to variable VREF1. Block 512 then takes the six most significant bits of the channel 1 distance and adds them to variable VCOMP1. Variable VCOMP1 represents the amount of compensation current required for correction of the North/South channel of sensor 46. After block 512, block 514 determines if an overflow occurred as a result of the addition performed in block 512. If an overflow occurred, then block 516 executes the RAIL subroutine which signals the driver of the vehicle, via display 56, that the compass has no more calibration capability due to an extremely large amount of vehicle magnetism such that the area in the vicinity of the compass must be degaussed. After block 516, or if block 514 determines that an overflow did not occur, the program proceeds to block 518.

Referring again to block 498, if it is determined that the channel 1 data is not negative, then block 500 strips off the two least significant bits of the channel 1 distance and subtracts them from variable VREF1. Next, block 502 takes the six most significant bits of the channel 1 distance and subtracts them from variable VCOMP1. Block 504 then determines if an underflow occurred as a result of the subtraction performed in block 502. If an overflow occurred, then block 506 executes the RAIL subroutine described above. After block 506, or if block 504 determines that an underflow did not occur, the program proceeds to block 518 which determines if the channel 2 (East/West channel) data is negative. This data indicates both the direction and distance which the X-Y coordinate plane must be shifted on the Y axis. If it is negative, then block 520 negates the distance to make it positive, and the program proceeds to block 530 of FIG. 16B. If block 518 determines that the channel 2 data is not negative, then the program proceeds to block 522 of FIG. 16B.

Block 522 of FIG. 16B of the MOVE2PT subroutine 496 is entered only if block 518 of FIG. 16A determined that the channel 2 data was not negative. Block 522 strips off the two least significant bits of the channel 2 distance and subtracts them from variable VREF2. Next, block 524 takes the six most significant bits of the channel 2 distance and subtracts them from variable VCOMP2. Variable VCOMP2 represents the amount of compensation current required for correction of the East/West channel of sensor 46. After block 524, block 526 determines if an underflow occurred as a result of the subtraction performed in block 524. If an underflow occurred, then block 528 executes the RAIL subroutine which signals the driver of the vehicle, via display 56, that the compass has no more calibration capability due to an extremely large amount of vehicle magnetism requiring that the area in the vicinity of the compass be degaussed. After block 528, or if block 526 determines that an underflow did not occur, then the program proceeds to block 538.

Referring now to block 530, this block is entered only if block 518 of FIG. 16A determined that the channel 2 data was negative. Block 530 strips off the two least significant bits of the channel 2 distance and adds them to variable VREF2. Next, block 532 takes the six most significant bits of the channel 2 distance and adds them to variable VCOMP2. Block 534 then determines if an overflow occurred as a result of the addition performed in block 532. If an overflow occurred, then block 536 executes the RAIL subroutine described above. After block 536, or if block 534 determines that an overflow did not occur, the program proceeds to block 538. Block 538 shifts the variable BSTAT to its next higher value and executes the DTOA subroutine which ensures that variables VCOMP1 and VCOMP2 are correctly adjusted and which supplies correctional signals derived therefrom to magnetometer 48 to be applied to sensor 46. Next, block 540 sets the nonvolatile memory write flag (NVMWRT flag) and clears the circle crossing data used in the compensation system described in U.S. Pat. No. 4,953,305. The subroutine then exits via block 542.

Figure 17:
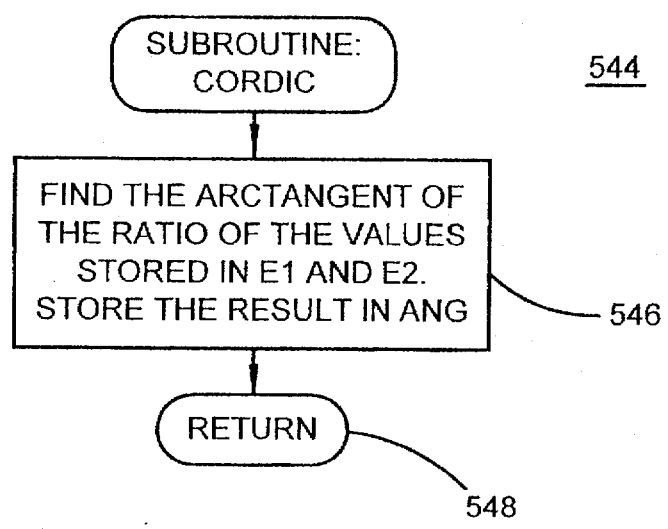

Referring to FIG. 17, the CORDIC subroutine 544 is shown. This subroutine is executed in block 190 of the main compass routine of FIG. 4D to calculate the heading of the vehicle using the arctangent function. The subroutine begins with block 546 which calculates the arctangent of the ratio of compass data values stored in buffers E1 and E2. Block 546 stores the result of this calculation in variable ANG which indicates the heading of the vehicle. The subroutine is then exited via block 548.

Figure 18:
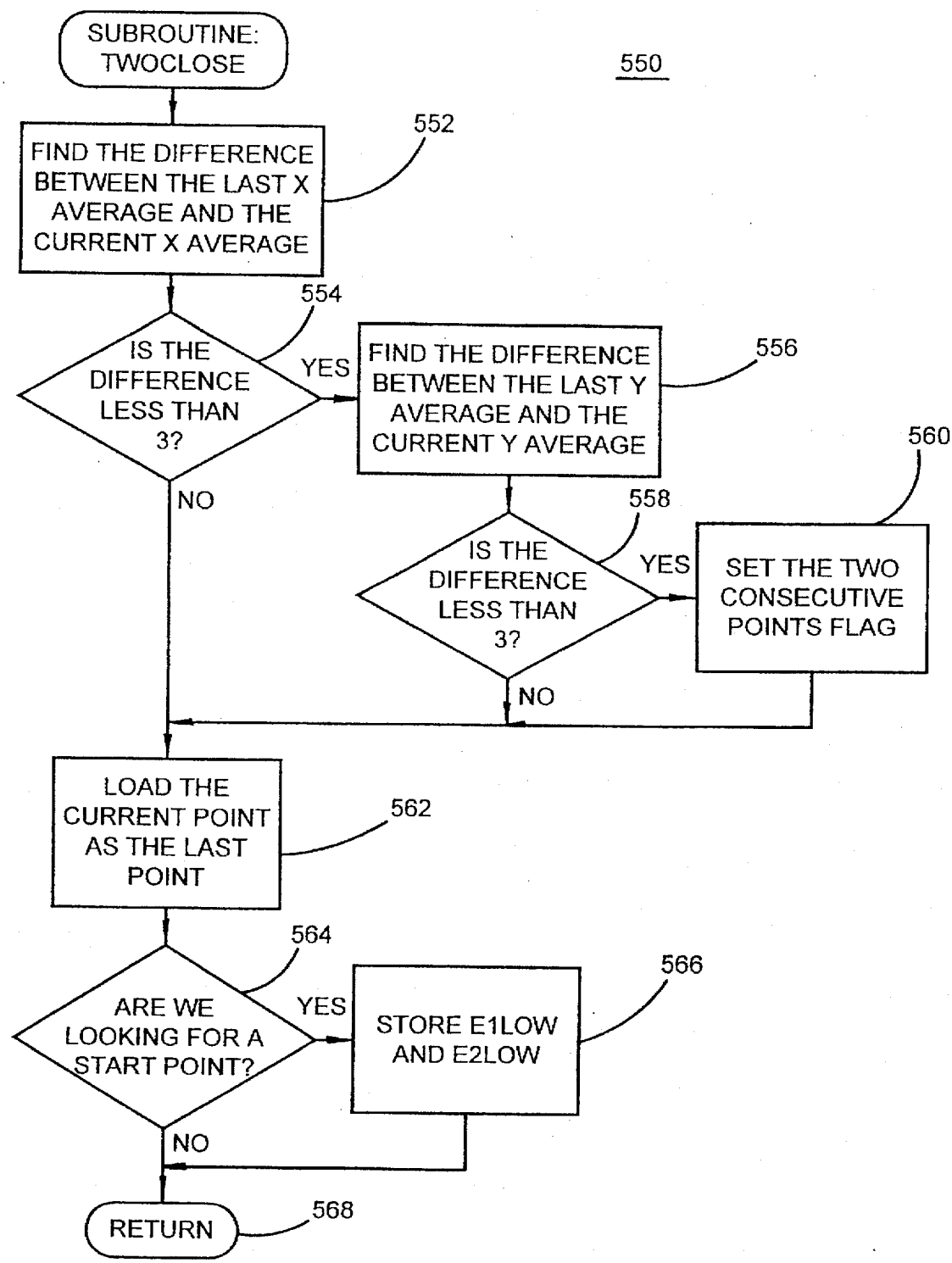

FIG. 18 shows the TWOCLOSE subroutine 550. This subroutine is executed in blocks 202 and 210 of the main program routine of FIG. 4D to determine if the vehicle has been travelling in close to the same direction for four seconds. The subroutine begins with block 552 which calculates the difference between the last North/South channel average, stored in variable LASTE1, and the current North/South channel average. Next, block 554 determines if this difference is less than the tolerance limit of three counts. If it is, then block 556 calculates the difference between the last East/West channel average, stored in variable LASTE2, and the current East/West channel average. The program then proceeds to block 558 which determines if this difference is less than three. If it is, then block 560 sets the TWOPTS flag to indicate that two averaged points have been found that are within three counts of each other. After block 560, or if block 558 determines that the difference calculated in block 556 is greater than three, the program proceeds to block 562. Similarly, the program proceeds to block 562 if block 554, mentioned above, determines that the difference calculated in block 552 is greater than three. Block 562 loads the current compass data point into variables LASTE1 and LASTE2. Next, block 564 determines if the program is looking for a starting point of the arc by examining the status of the BSTAT variable. If it is, then block 566 stores the current compass data point into E1LOW and E2LOW. After block 566, or if block 564 determines that the program is not looking for a starting point of the arc, then the subroutine is exited via block 568.

Figure 19:
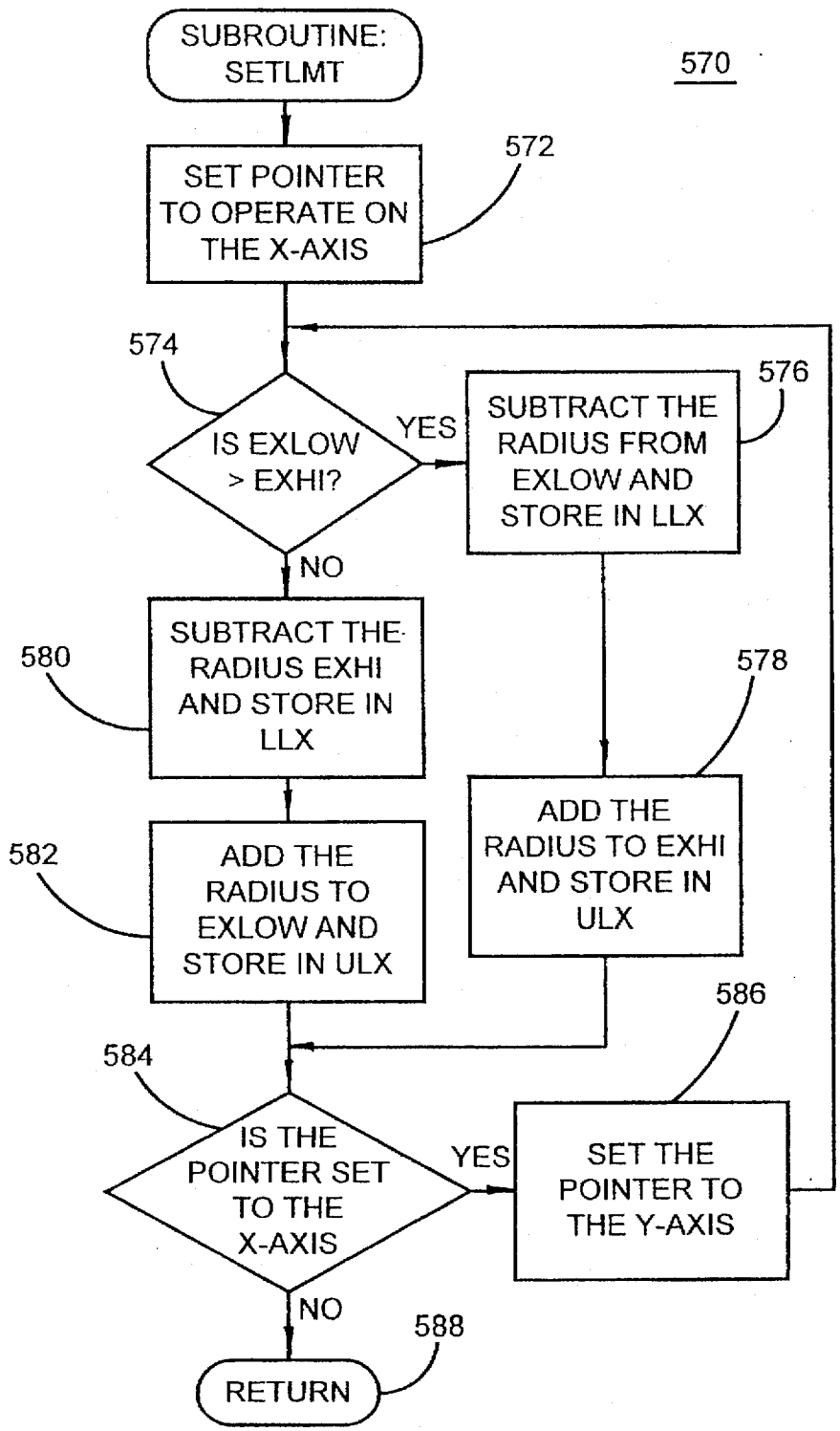

Referring to FIG. 19, shown is the SETLMT subroutine 570. This subroutine is executed in block 222 of the main program routine 100 of FIG. 4E to establish the upper and lower horizontal and vertical limits in which to search for the center of the arc in the X-Y coordinate plane. These limits are based on the position of the starting point and ending point of the arc which must both be a radius away from the center of the arc. The subroutine begins with block 572 which sets a pointer to operate on the X axis (East/West channel data axis). Next, block 574 determines if ExLOW is greater than ExHI, where x is the number 2 when East/West channel data is being processed and is the number 1 when North/South channel data is being processed. If ExLow is greater than ExHI, then block 576 subtracts the radius of the arc, which is the same as the radius of the circle for a calibrated compass, from ExLOW and stores the result in LLx. Next, block 578 adds the radius of the arc to ExHI and stores the result in ULx, and the program proceeds to block 584. If block 574 determines that ExLOW is less than ExHI, then block 580 subtracts the radius of the arc from ExHI and stores the result in LLx. Next, block 582 adds the radius of the arc to ExLOW and stores the result in ULx. The program then proceeds to block 584 which determines if the pointer is set to the X axis (East/West channel data axis). If it is, then block 586 sets the pointer to the Y axis (North/South channel data axis), and the program proceeds back to block 574 to set the Y axis limits. If block 58,4 determines that the pointer is not set to the X axis, then the subroutine is exited via block 588.

Figure 20A:
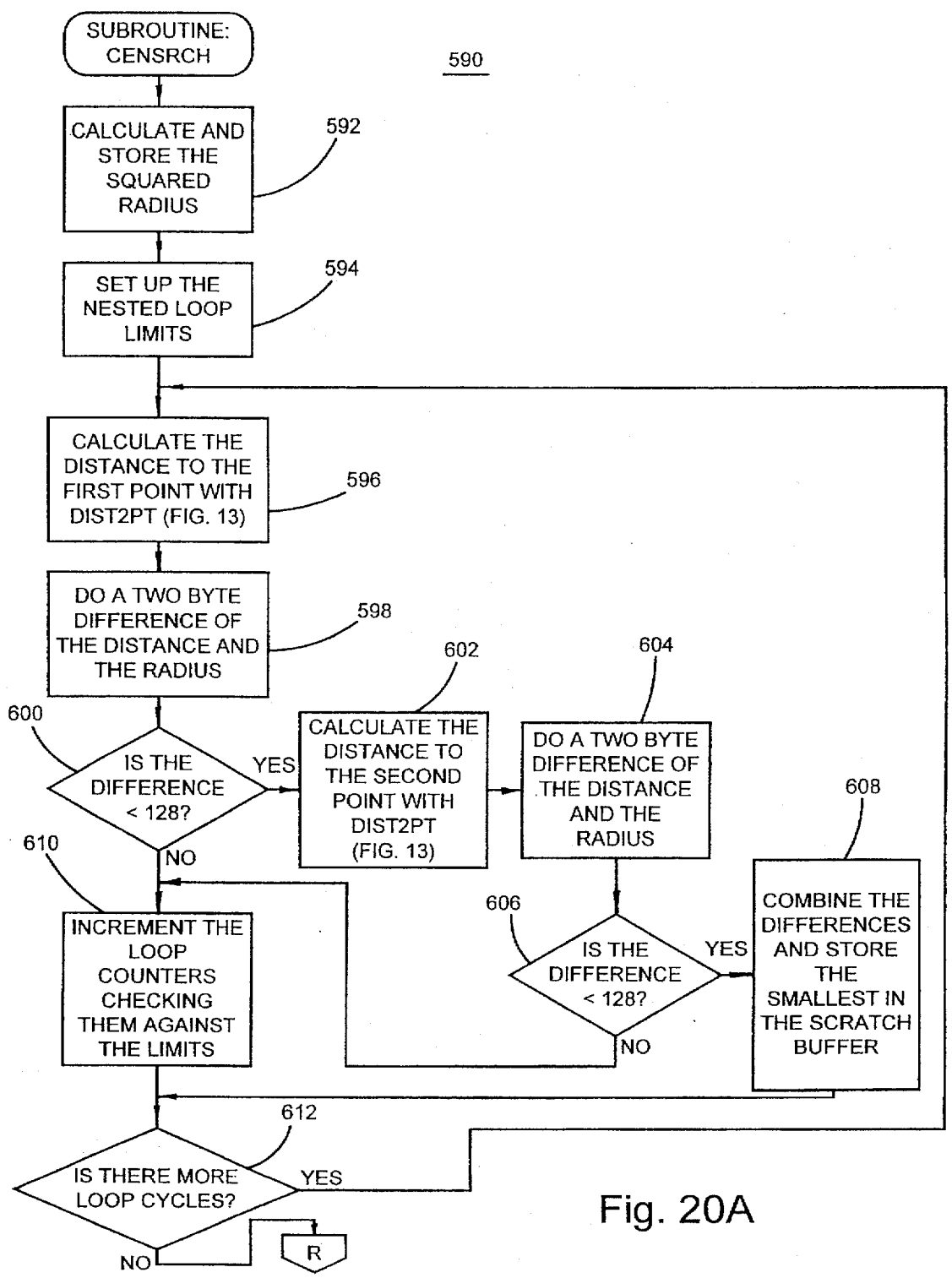
Figure 20B:
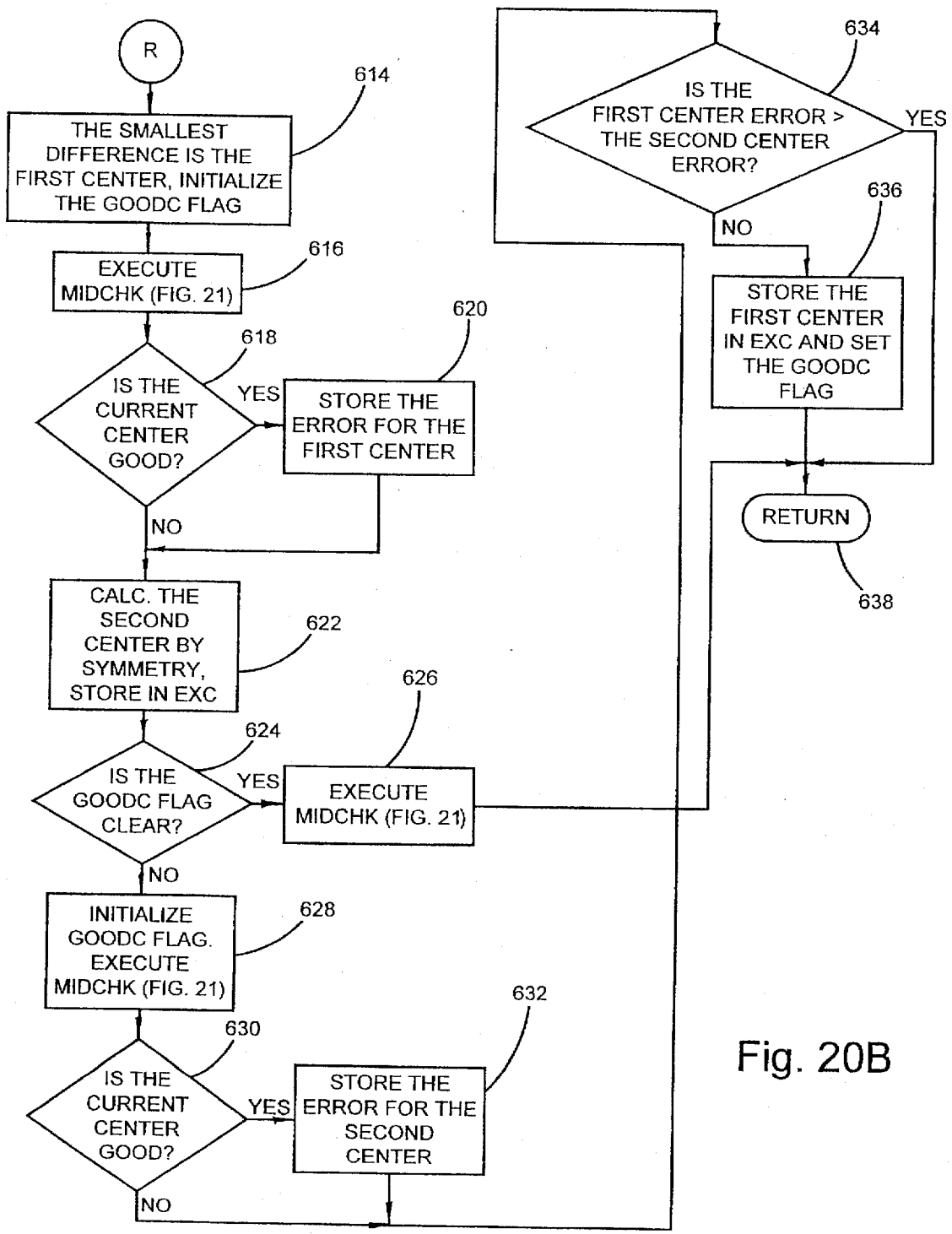

FIGS. 20A and 20B show the CENSRCH subroutine 590. This subroutine is executed in block 224 of the main program routine 100 of FIG. 4E to search for the center of the arc within the limits established by the SETLMT subroutine 570. The subroutine begins with block 592 which calculates and stores the squared radius of the arc. Next, block 594 sets up the nested loop limits based on the values stored in variables LL1, LL2, UL1, and UL2. Block 596 then executes the DIST2PT subroutine 454 of FIG. 13 to calculate the distance from a particular point within the established limits to the starting point of the arc stored in variables E1LOW and E2LOW. Upon return from the DIST2PT subroutine 454, block 598 performs a two byte subtraction of the calculated distance from the radius of the arc. The program then proceeds to block 600 which determines if the difference calculated in block 598 is less than 128 which is a predetermined tolerance within which the difference must be in order for the particular point being analyzed to be considered as a possible center of the arc. If the difference is not less than 128, then block 610 increments the loop counters and ensures that they are within the established limits.

The program then proceeds to block 612. If block 600 determines that the difference calculated in block 598 is less than 128, then block 602 executes the DIST2PT subroutine 454 to calculate the distance from the particular point within the established limits to the ending point of the arc stored in variables E1HI and E2HI. Upon return from the DIST2PT subroutine 454, block 604 performs a two byte subtraction of the calculated distance from the radius of the arc. Block 606 then determines if the difference calculated in block 604 is less than the 128 predetermined tolerance limit. If not, then the program proceeds to block 610, which is described above. If the difference is less than 128, then block 608 combines the differences calculated in blocks 598 and 604 and stores the result, as well as the coordinates of the particular point, in the scratch buffer if the result is less than the result already stored there. As such, the scratch buffer will ultimately store the coordinates of the point within the established limits which has the smallest combined differences calculated in blocks 598 and 604. The program then proceeds to block 612 which determines if more loop cycles must be executed in order to analyze all points within the established limits. If there are, then the program proceeds back to block 596. If no more loop cycles must be executed, then the program proceeds to block 614 of FIG. 20B.

Block 614 of FIG. 20B stores in variables E1C and E2C the coordinates of the point ultimately stored in the scratch buffer in block 608 of FIG. 20A which is the first potential center point of the arc. Block 614 also stores the coordinates of the first potential center point in the scratch buffer and initializes the GOODC flag. Next, block 616 executes the MIDCHK subroutine 640 to determine if the potential center point is within a predetermined tolerance of being a radius away from the 45° midpoint of the arc. This subroutine is described in greater detail below in connection with FIG. 21. Upon return from the MIDCHK subroutine 640, the program proceeds to block 618 which determines if the GOODC flag is set indicating that the MIDCHK subroutine determined that the first potential center point is within a predetermined tolerance of being a radius away from the 45° midpoint of the arc. If the GOODC flag is set, then block 620 stores in the scratch buffer the error value for the first potential center point, calculated in block 644 of the MIDCHK subroutine 640, which represents the degree to which the first potential center point is within the above-mentioned tolerance. After block 620, or if block 618 determines that the GOODC flag is not set, then the program proceeds to block 622 which calculates the second potential center point of the arc using symmetry. The second potential center point is symmetrical to the first potential center point with respect to the line segment connecting the starting point and ending point of the arc. Block 622 stores the coordinates of the second potential center point in variables E1C and E2C. Next, block 624 again determines the status of the GOODC flag based on the execution of the MIDCHK subroutine 640 in block 616. If the GOODC flag is clear, indicating that the first potential center point is outside a predetermined tolerance, then block 626 executes the MIDCHK subroutine 640 of FIG. 21 using the coordinates of the second potential center point of the arc.

Upon return from the MIDCHK subroutine, the program exits the subroutine via block 638. If block 624 determines that the GOODC flag is set, then block 628 initializes the GOODC flag and executes the MIDCHK subroutine 640 using the coordinates of the second potential center point of the arc. Upon return from the MIDCHK subroutine, block 630 determines if the GOODC flag is set indicating that the second potential center point is within a predetermined tolerance of being a radius away from the 45° midpoint of the arc. If the GOODC flag is set, then block 632 stores in the scratch buffer the error value for the second potential center point, calculated in block 644 of the MIDCHK subroutine 640, which represents the degree to which the second potential center point is within the above-mentioned tolerance. After block 632, or if block 630 determines that the GOODC flag is clear, then the program proceeds to block 634. Block 634 determines if the error value for the first potential center point is greater than the error value for the second potential center point. If it is, then the coordinates of the second potential center point, stored in variables E1C and E2C, is the center of the arc, and the subroutine is exited via block 638. If block 634 determines that the error value for the first potential center point is less than the error value for the second potential center point, then block 636 stores the coordinates of the first potential center point, stored in the scratch buffer in block 614, into variables E1C and E2C as the center point of the arc. Block 636 also sets the GOODC flag, and the subroutine is exited via block 638.

Figure 21:
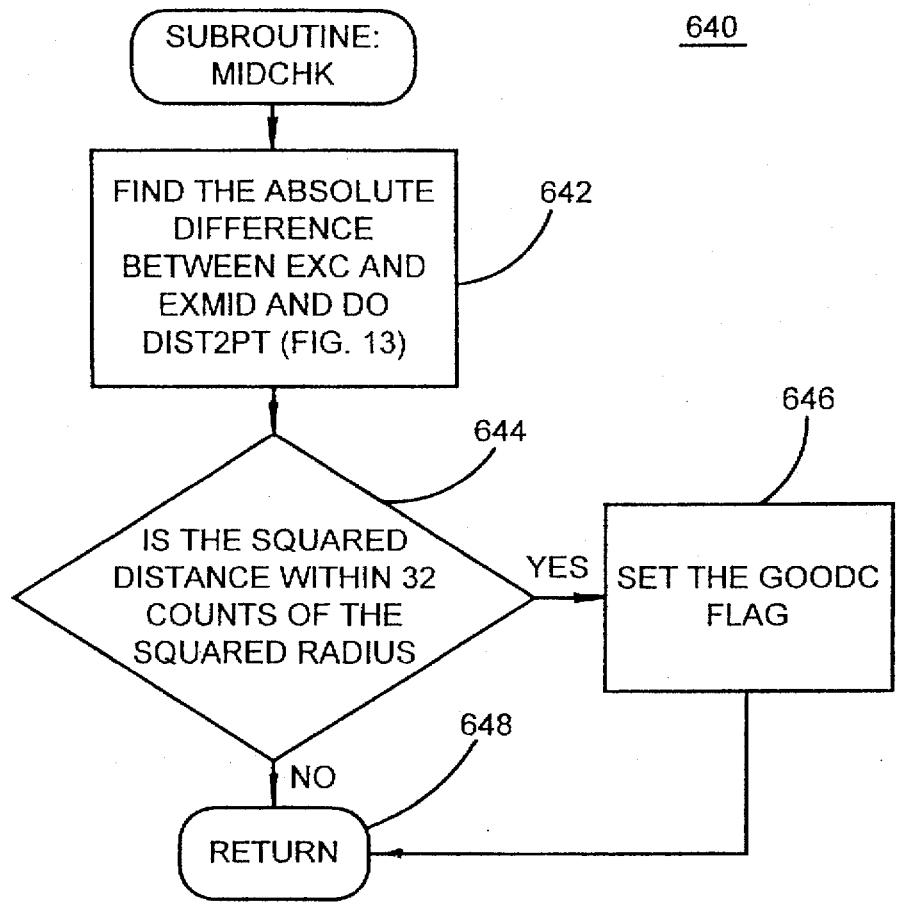

The MIDCHK subroutine 640 is shown in FIG. 21. This subroutine is executed in blocks 616, 626, and 628 of FIG. 20B of the CENSRCH subroutine 590 to determine if the potential center point is within a predetermined tolerance of being a radius away from the 45° midpoint. The subroutine begins with block 642 which executes the DIST2PT subroutine 454 of FIG. 13 to calculate the distance between the potential center point stored in variables E1C and E2C and the midpoint stored in variables E1MID and E2MID. Upon return from the DIST2PT subroutine 454, block 644 determines if the squared distance calculated in block 642 is within 32 counts of the squared radius of the arc, which is the same as the radius of the circle for a calibrated compass. If it is within this predetermined tolerance limit, then block 646 sets the GOODC flag to indicate that a "good" potential center point has been found. After block 646, or if block 644 determines that the square of the distance calculated in block 642 is not within 32 counts of the squared radius, then the subroutine is exited via block 648.

Figure 22:
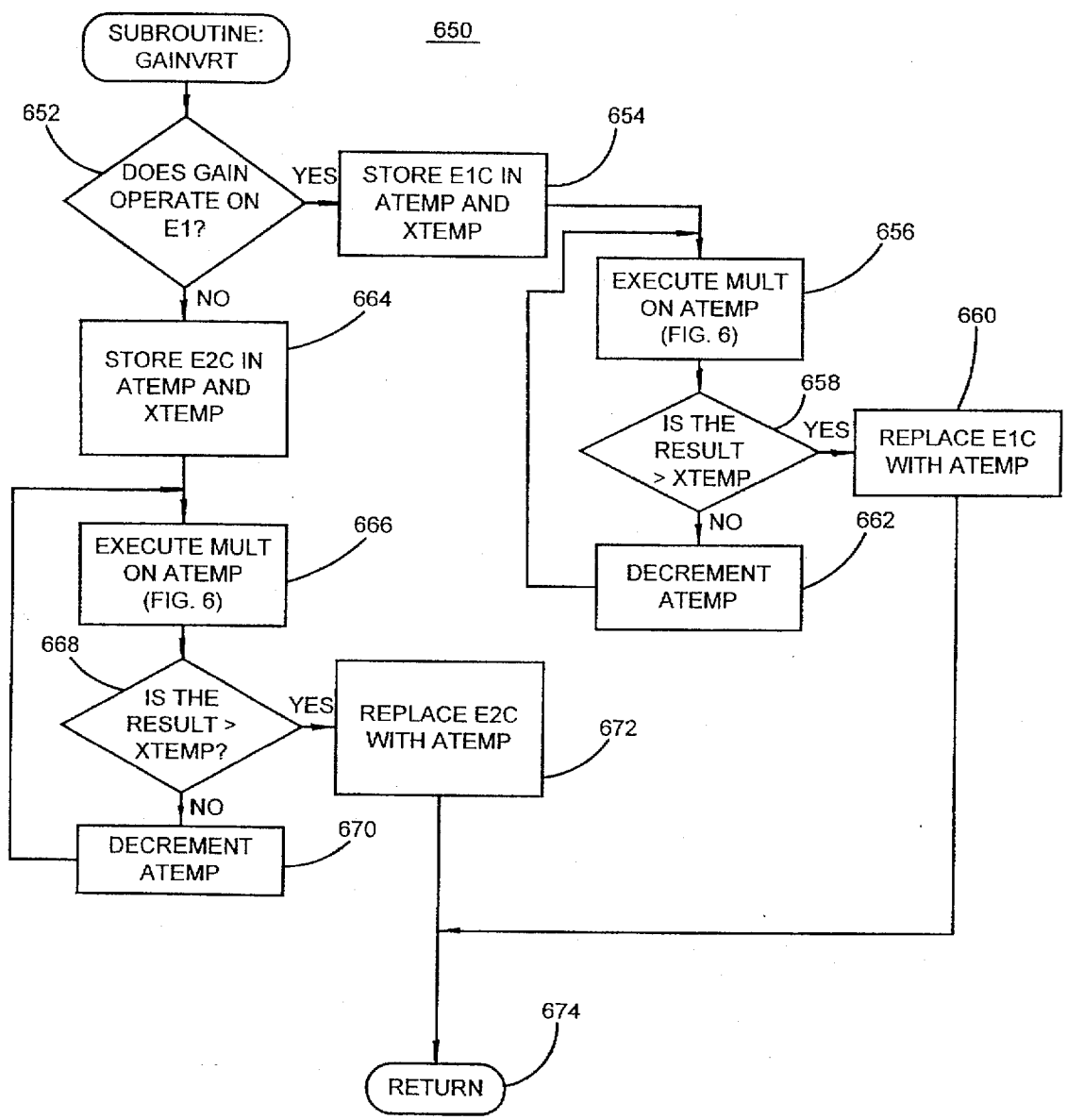

Referring to FIG. 22, shown is the GAINVRT subroutine 650. This subroutine is executed in block 228 of the main program routine 100 of FIG. 4E and reverses the effects of the MAKEQU subroutine 300 of FIG. 6 which is used to make the elliptical data circular. By removing any multiplication factors used to make the compass data circular, this subroutine returns the data to its original form and thus facilitates the subsequent manipulation of that data. The subroutine begins with block 652 which determines if the GAIN value operates on the compass channel data in buffer E1. If it does, then block 654 stores the coordinates of variable E1C into temporary storage variables ATEMP and XTEMP. Next, block 656 executes the MULT subroutine 324 of FIG. 6 on variable ATEMP. Upon return from the MULT subroutine 324, block 658 determines if the result is greater than variable XTEMP. If not, then block 662 decrements variable ATEMP, and the program loops back to block 656. If block 658 determines that the result of block 656 is greater than variable XTEMP, then block 660 replaces variable E1C with variable ATEMP, and the program proceeds to block 674 which exits the subroutine. If block 652 determines that the GAIN value does not operate on the compass channel data in buffer E1, then block 664 stores the coordinates of variable E2C into temporary storage variables ATEMP and XTEMP. Next, block 666 executes the MULT subroutine 324 on variable ATEMP. Upon return from the MULT subroutine 324, block 668 determines if the result is greater than variable XTEMP. If not, then block 670 decrements variable ATEMP, and the program loops back to block 666. If block 668 determines that the result of block 666 is greater than variable XTEMP, then block 672 replaces variable E2C with variable ATEMP, and the subroutine is exited via block 674.

As described above, the programming of the preferred embodiment of the present invention implements the compass compensation system of U.S. Pat. No. 4,953,305 if a change in vehicle magnetism causes the subsequent plot of digital sensor data to be within a particular threshold. However, the flowcharts of FIGS. 4–22 can be modified such that the method described above to correct for abrupt and significant changes in vehicle magnetism can be used to compensate for all changes in vehicle magnetism which adversely affect compass operation. In this alternative embodiment, the threshold against which the plot of digital sensor data is compared is reduced from that of the preferred embodiment so that any shift in vehicle magnetism adversely affecting compass operation causes the plot of digital sensor data to be outside of this threshold and the compass to be calibrated.

In addition to providing compensation for abrupt and significant changes in vehicle magnetism during normal operating conditions of a vehicle, the compass system of the present invention also provides a convenient method of compensating for the initial vehicle magnetism of a new vehicle. This method involves preloading microprocessor 50 before or upon installation into the vehicle with all necessary data such that the system is preset into the process of recovering from an abrupt and significant change in vehicle magnetism. Primarily, this involves establishing the earth's magnetic field strength and setting variable BSTAT equal to 1. Having been preset into the recovery mode, the compass system automatically calibrates itself after the vehicle changes its direction of travel in excess of the predetermined amount which is 80° in the preferred embodiment. This method of calibration can be easily implemented to compensate for the initial vehicle magnetism of a new vehicle by establishing a curved route either at the exit of the vehicle manufacturing plant or at the dealer's place of business on which the new vehicle is driven such that its direction of travel is changed the predetermined amount and the compass is quickly calibrated.

The present invention provides a significantly improved compass system which generates more accurate heading information over differing conditions of operation. In particular, the present invention provides automatic calibration of a vehicle's compass which compensates for abrupt and significant changes in vehicular magnetism during normal operation of., the vehicle. Also provided is a system and method by which to efficiently compensate for the initial vehicle magnetism of a new vehicle. In the preferred embodiment of the present invention, a system is provided which compensates for all changes in vehicular magnetism which are detrimental to proper compass operation.

The above description is considered that of the preferred embodiments only. Modifications of the invention will occur to those skilled in the art and to those who make or use the invention. Therefore, it is understood that the embodiments shown in the drawings and described above are not intended to limit the scope of the invention, which is defined by the following claims as interpreted according to the principles of patent law.

The embodiments of the invention in which an exclusive property or privilege is claimed are defined as follows:

1. An electrical quick calibration compass system for use in a vehicle such as an automobile comprising:
   a magnetic field sensor for detecting the earth's magnetic field and for providing electrical signals representing the direction of the vehicle in relation to the earth's magnetic field;
   a processing circuit coupled to said sensor for processing signals from said sensor and for providing display output signals in response thereto;
   a display circuit coupled to said processing circuit and responsive to said display output signals for displaying the vehicle heading; and
   said processing circuit responsive to signals from said sensor, during which time the change of direction of the vehicle is less than a closed loop, for determining that the detected signal levels from said sensor, corresponding to the effect of the earth's magnetic field and the effect of vehicle magnetism on said sensor, have shifted such that said signal levels are outside a predetermined threshold, said processing circuit responsive to said determination that said signal levels are outside said threshold for recalibrating said compass system using the detected signal levels output from said sensor during the time in which the vehicle direction changed less than a closed loop;
   wherein said processing circuit adjusts the detected signal levels after determining that the vehicle's direction of travel has changed a predetermined amount corresponding to a plot of said detected signal levels from said sensor creating an arc spanning a predetermined angle, said arc has a starting point and an ending point that are used to determine the center of said arc, the center of the arc being determined by assuming a radius and identifying at least one center candidate point that is spaced apart from the starting point and the ending point by the assumed radius.

2. The system as defined in claim 1 wherein said processing circuit recalibrates the compass system after determining that the vehicle's direction of travel has changed a predetermined amount.

3. The system as defined in claim 2 wherein said predetermined amount corresponds to a plot of said detected signal levels from said sensor creating an arc spanning a predetermined angle.

4. The system as defined in claim 3 wherein said predetermined angle is at least about 80°.

5. The system as defined in claim 1 wherein said assumed radius is equal to the radius used during a previous calibration.

6. The system as defined in claim 1 wherein said intermediate point corresponds to the point at which said arc spans a second predetermined angle.

7. The system as defined in claim 6 wherein said second predetermined angle is at least about 45°.

8. The system as defined in claim 1 wherein, when more than one center candidate point is identified, said processing circuit references an intermediate sensed point on said arc and identifies the center point of said arc as the center candidate point that is spaced apart from the intermediate point by said assumed radius.

9. The system as defined in claim 1 wherein said processing circuit applies compensation correction signals to said sensor such that signals from said sensor define an arc as the vehicle turns, which arc has a center corresponding to that of a compensated compass.

10. The system as defined in claim 1 wherein said processing circuit adjusts the detected signal levels both before and after determining that the vehicle's direction of travel has changed a predetermined amount.

11. The system as defined in claim 1 wherein said processing circuit includes a microprocessor.

12. The system as defined in claim 11 wherein said magnetic field sensor is a flux-gate sensor.

13. The system as defined in claim 1 wherein said predetermined threshold is a detected magnetic field change of at least about 100 milligauss.

14. An electrical quick calibration compass system for use in a vehicle such as an automobile comprising:
   a magnetic field sensor for detecting the earth's magnetic field and for providing electrical signals representing the direction of the vehicle in relation to the earth's magnetic field;
   a processing circuit coupled to said sensor for processing signals from said sensor and for providing display output signals in response thereto;
   a display circuit coupled to said processing circuit and responsive to said display output signals for displaying the vehicle heading; and said processing circuit responsive to signals from said sensor, for adjusting the detected signal levels after determining that the vehicle's direction of travel has changed a predetermined amount corresponding to a plot of said detected signal levels from said sensor creating an arc spanning a predetermined angle, said arc has a starting point and an ending point that are used to determine the center of said arc, the center of the arc being determined by assuming a radius and identifying at least one center candidate point that is spaced apart from the starting point and the ending point by the assumed radius.

15. The system as defined in claim 14 wherein, when more than one center candidate point is identified, said processing circuit references an intermediate sensed point on said arc and identifies the center point of said arc as the center candidate point that is spaced apart from the intermediate point by said assumed radius.

16. An electrical quick calibration compass system for use in a vehicle such as an automobile comprising:

a magnetic field sensor for detecting the earth's magnetic field and for providing electrical signals representing the direction of the vehicle in relation to the earth's magnetic field;

a processing circuit coupled to said sensor for processing signals from said sensor and for providing display output signals in response thereto;

a display circuit coupled to said processing circuit and responsive to said display output signals for displaying the vehicle heading; and said processing circuit responsive to signals from said sensor for determining that the detected signal levels from said sensor, corresponding to the effect of the earth's magnetic field and the effect of vehicle magnetism on said sensor, have shifted such that said signal levels are outside a predetermined threshold for a predetermined distance of travel of the vehicle, said processing circuit responsive to said determination for calculating compensation signals to adjust said detected signal levels such that said detected signal levels are within said predetermined threshold and for correcting said display output signals to display the vehicle heading.

17. The system as defined in claim 16 wherein said predetermined distance is from about ⅛ to ¼ mile.

18. The system as defined in claim 16 wherein said processing circuit adjusts the detected signal levels after determining that the vehicle's direction of travel has changed a predetermined amount.

19. The system as defined in claim 18 wherein said predetermined amount corresponds to a plot of said detected signal levels from said sensor creating an arc spanning a predetermined angle.

20. The system as defined in claim 19 wherein said predetermined angle is at least about 80°.

21. The system as defined in claim 16 wherein said processing circuit includes a microprocessor.

22. The system as defined in claim 16 wherein said magnetic field sensor is a flux-gate sensor.

23. The system as defined in claim 16 wherein said predetermined threshold is a detected magnetic field change of at least about 100 milligauss.

24. An electrical quick calibration compass system for use in a vehicle such as an automobile comprising:

sensing means for detecting the earth's magnetic field and for providing electrical signals representing the direction of the vehicle in relation to the earth's magnetic field;

circuit means coupled to said sensing means for processing signals therefrom and for providing display output signals in response thereto;

display means coupled to said circuit means and responsive to said display output signals for displaying the vehicle heading; and said circuit means including determining means responsive to signals from said sensing means, during which time the change of direction of the vehicle is less than a closed loop, for determining when the detected signal levels from said sensing means, corresponding to the effect of the earth's magnetic field and the effect of vehicle magnetism on said sensing means, have changed such that said signal levels exceed a predetermined threshold, said circuit means further including means for recalibrating said compass system using the detected signal levels output from said sensing means during the time in which the vehicle direction changed less than a closed loop, wherein said determining means determines that said detected signal levels from said sensing means are outside said predetermined threshold for a predetermined distance of travel of the vehicle before calculating compensation data.

25. The system as defined in claim 24 wherein said predetermined threshold is a detected magnetic field change of at least about 100 milligauss.

26. The system as defined in claim 24 wherein said predetermined distance is from about ⅛ to ¼ mile.

27. The system as defined in claim 24 wherein said circuit means adjusts said detected signal levels after said circuit means determines that the vehicle's direction of travel has changed a predetermined amount.

28. The system as defined in claim 27 wherein said predetermined amount is at least about an arc of 80°.

29. An electrical quick calibration compass system for use in a vehicle such as an automobile comprising:

a magnetic field sensor for detecting the earth's magnetic field and for providing electrical signals representing the direction of the vehicle in relation to the earth's magnetic field;

a processing circuit coupled to said sensor for processing signals therefrom and for providing display output signals in response thereto;

a display circuit coupled to said processing circuit and responsive to said display output signals for displaying the vehicle heading; and said processing circuit responsive to signals from said sensor, during which time the change of direction of the vehicle is less than a closed loop, for monitoring signals from said sensor which correspond to the effect of the earth's magnetic field and the effect of vehicle magnetism on said sensor for determining when the detected signal levels have shifted such that said signal levels are outside a predetermined threshold for a predetermined distance of travel of the vehicle, said processing circuit responsive to said determination for calculating compensation signals to adjust said detected signal levels after said processing circuit detects that the vehicle's direction of travel has changed a predetermined amount such that said detected signal levels are within said threshold and substantially coincide with stored signal levels before the shift occurred.

30. The system as defined in claim 29 wherein said direction of travel is an arc of at least about 80°.

31. The system as defined in claim 25 wherein said predetermined threshold is a detected magnetic field change of at least about 100 milligauss.

32. The system as defined in claim 29 wherein said predetermined distance is from about ⅛ to ¼ mile.

33. An electrical compass system for use in a vehicle, said system including a sensor for sensing a magnetic field and for providing output signals representative thereof, a processing circuit coupled to said sensor for processing said signals and for providing display output signals in response thereto, and a display circuit coupled to said processing circuit and responsive to said display output signals for displaying the vehicle heading, said processing circuit continuously monitoring signal information from said sensor when the vehicle has travelled through a path for determining the maximum and minimum detected signal levels from said sensor, corresponding to the effect of the earth's magnetic field and the effect of vehicle magnetism on said sensor, and during the course of movement of the vehicle through the path calculating from said maximum and minimum detected signal levels an offset signal for providing compensating signals to display the correct vehicle heading; wherein the improvement comprises:

said processing circuit programmed to compensate for large changes in vehicle magnetism caused by local magnetic field interference by detecting, during which time the change of direction of the vehicle is less than a closed loop, when sensor signal levels have shifted such that said signal levels are outside a predetermined threshold indicating an abnormal change in vehicle magnetism, said processing circuit responsive to said detection for recalibrating said compass system using the detected signal levels output from said sensor during the time in which the vehicle direction changed less than a closed loop, wherein said processing circuit is responsive to said sensor for determining that signal levels from said sensor are outside said predetermined threshold for a predetermined distance of travel of the vehicle.

34. The system as defined in claim 33 wherein said sensor is a flux-gate sensor.

35. The system as defined in claim 33 wherein said processing circuit includes a microprocessor.

36. The system as defined in claim 35 wherein said processing circuit adjusts said sensor signal levels after said processing circuit determines that the vehicle's direction of travel has changed a predetermined amount.

37. The system as defined in claim 36 wherein said predetermined amount of vehicle's direction of travel change is at least about 80°.

38. The system as defined in claim 33 wherein said predetermined threshold is a detected magnetic field change of at least about 100 milligauss.

* * * * *

UNITED STATES PATENT AND TRADEMARK OFFICE
CERTIFICATE OF CORRECTION

PATENT NO. : 5,737,226
DATED : April 7, 1998
INVENTOR(S) : Thomas R. Olson et al.

Page 1 of 2

It is certified that error appears in the above-indentified patent and that said Letters Patent is hereby corrected as shown below:

Column 1, line 12, "vehicles" should be --vehicle--.

Column 2, line 34, "Will" should be --will--.

Column 2, line 54, "a vehicle 10" should be --a portion of a vehicle--.

Column 2, line 55, "module 11" should be --module--.

Column 2, line 58, "module 11" should be --module--.

Column 8, line    "dam" should be --data--.

Column 9, line 28, "1/8" should be --⅛--.

Column 10, line 56, "2" should be --two--.

Column 11, line 39, "are" should be --arc--.

Column 12, line 35, "staffing" should be --starting--.

Column 14, line 54, "5" should be --5--.

Column 15, line 29, "20" should be --20--.

Column 19, line 50, "are" should be --arc--.

UNITED STATES PATENT AND TRADEMARK OFFICE
CERTIFICATE OF CORRECTION

PATENT NO. : 5,737,226
DATED : April 7, 1998
INVENTOR(S) : Thomas R. Olson et al.

It is certified that error appears in the above-indentified patent and that said Letters Patent is hereby corrected as shown below:

Column 19, line 55, "are" should be --arc--.

Column 24, line 20, "32" should be --32--.

Column 25, line 32, "of.," should be --of--.

Column 28, line 66, "25" should be --29--.

Column 30, line 15, "35" should be --33-- [34].

Signed and Sealed this

Seventh Day of July, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,737,226
DATED : April 7, 1998
INVENTOR(S) : Thomas R. Olson et al.

It is certified that error appears in the above-indentified patent and that said Letters Patent is hereby corrected as shown below:

Column 1, line 12, "vehicles" should be --vehicle--.

Column 2, line 34, "Will" should be --will--.

Column 2, line 54, "a vehicle 10" should be --a portion of a vehicle--.

Column 2, line 55, "module 11" should be --module--.

Column 2, line 58, "module 11" should be --module--.

Column 8, line 55, "dam" should be --data--.

Column 9, line 28, "1/8" should be --⅛--.

Column 10, line 56, "2" should be --two--.

Column 11, line 39, "are" should be --arc--.

Column 12, line 35, "staffing" should be --starting--.

Column 14, line 54, "5" should be --5--.

Column 15, line 29, "20" should be --20--.

Column 19, line 50, "are" should be --arc--.

UNITED STATES PATENT AND TRADEMARK OFFICE
CERTIFICATE OF CORRECTION

PATENT NO. : 5,737,226
DATED : April 7, 1998
INVENTOR(S) : Thomas R. Olson et al.

It is certified that error appears in the above-identified patent and that said Letters Patent is hereby corrected as shown below:

Column 19, line 55, "are" should be --arc--.

Column 24, line 20, "32" should be --32--.

Column 25, line 32, "of.," should be --of--.

Column 28, line 66, "25" should be --29--.

Column 30, line 15, "35" should be --33-- [34].

This certificate supersedes Certificate of Correction issued July 7, 1998

Signed and Sealed this

Twenty-second Day of September, 1998

Attest:

BRUCE LEHMAN

Attesting Officer       Commissioner of Patents and Trademarks